(12) United States Patent
Subbiah et al.

(10) Patent No.: US 10,848,441 B2
(45) Date of Patent: Nov. 24, 2020

(54) FIBRE CHANNEL OVER ETHERNET (FCOE) PINNING SYSTEM

(71) Applicant: Dell Products L.P., Round Rock, TX (US)

(72) Inventors: Ramesh Kumar Subbiah, Tamil Nadu (IN); Vibin Varghese, Tamil Nadu (IN)

(73) Assignee: Dell Products, L.P., Round Rock, TX (US)

( * ) Notice: Subject to any disclaimer, the term of this patent is extended or adjusted under 35 U.S.C. 154(b) by 232 days.

(21) Appl. No.: 16/138,568

(22) Filed: Sep. 21, 2018

(65) Prior Publication Data

US 2020/0099632 A1 Mar. 26, 2020

(51) Int. Cl.
*G06F 15/173* (2006.01)
*H04L 12/931* (2013.01)
*H04L 12/947* (2013.01)
*H04L 29/12* (2006.01)

(52) U.S. Cl.
CPC .......... *H04L 49/357* (2013.01); *H04L 49/252* (2013.01); *H04L 49/351* (2013.01); *H04L 61/6045* (2013.01)

(58) Field of Classification Search
CPC ..... H04L 49/25; H04L 49/253; H04L 49/357; H04L 49/252; H04L 61/6045; H04L 49/351

USPC ......................................................... 709/223
See application file for complete search history.

(56) References Cited

U.S. PATENT DOCUMENTS

| 9,942,144 | B1* | 4/2018 | Ramalingam | H04L 45/245 |
| 2010/0017497 | A1* | 1/2010 | Brown | H04L 12/4633 709/217 |
| 2018/0331977 | A1* | 11/2018 | Krishnasamy | H04L 45/245 |

* cited by examiner

*Primary Examiner* — Umar Cheema
*Assistant Examiner* — Anh Nguyen
(74) *Attorney, Agent, or Firm* — Haynes and Boone, LLP

(57) ABSTRACT

A Fibre Channel over Ethernet (FCoE) pinning system includes a first Fibre Channel Forwarder (FCF) device that is coupled to a Fibre Channel (FC) storage device through a first FCF device port, and that is coupled to a first server device through a second FCF device port that is included on an aggregated interface. The FCF device sends an FCF advertisement through the second FCF device port. The FCF device receives, from the first server device at the second FCF device port in response to sending the FCF advertisement through the second FCF device port, a server message that includes a first server port identifier of a first server port. The FCF device associates the first server port identifier with the second FCF device port to form a first FCF group and pins the first FCF group for FCoE traffic.

17 Claims, 20 Drawing Sheets

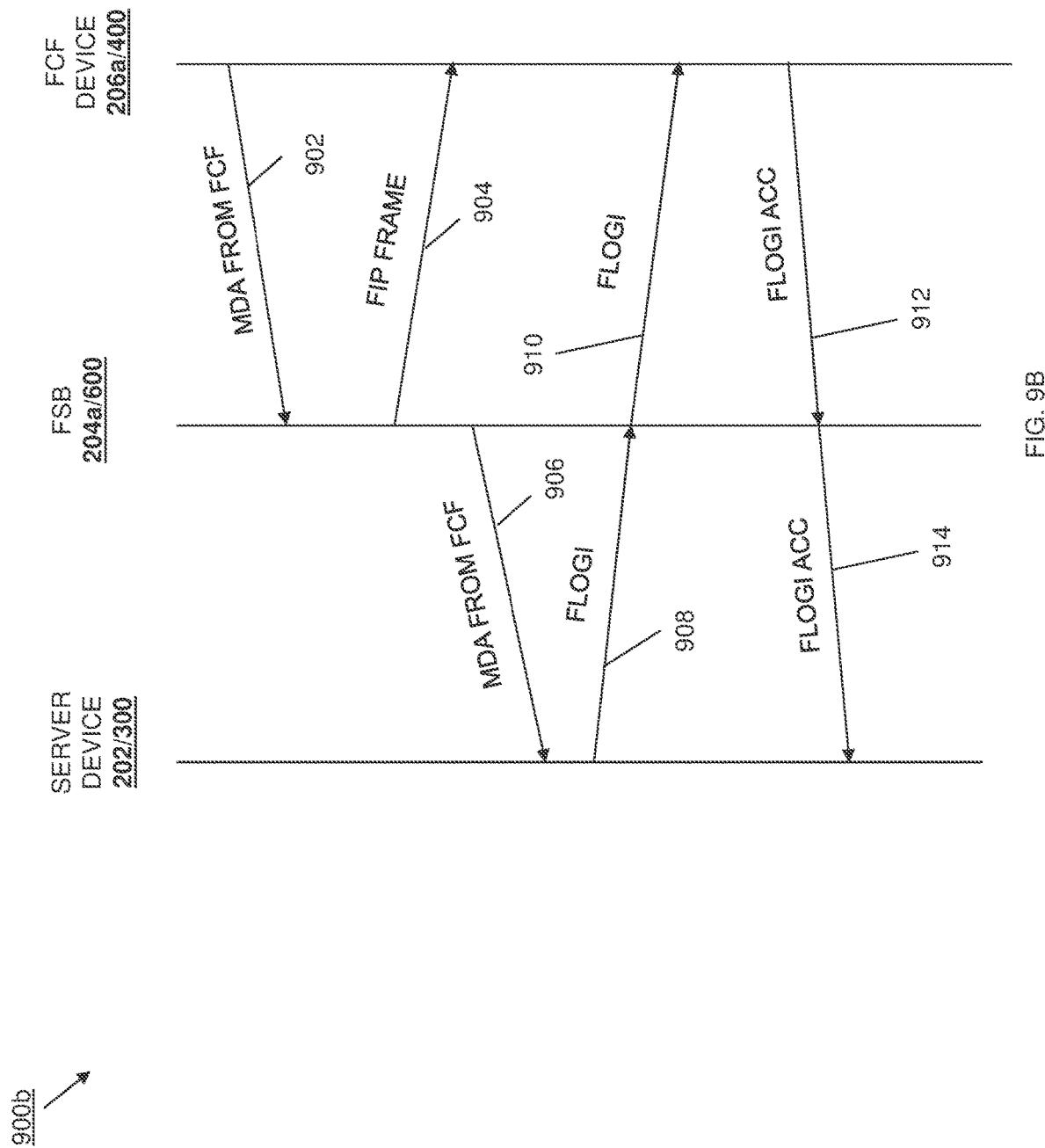

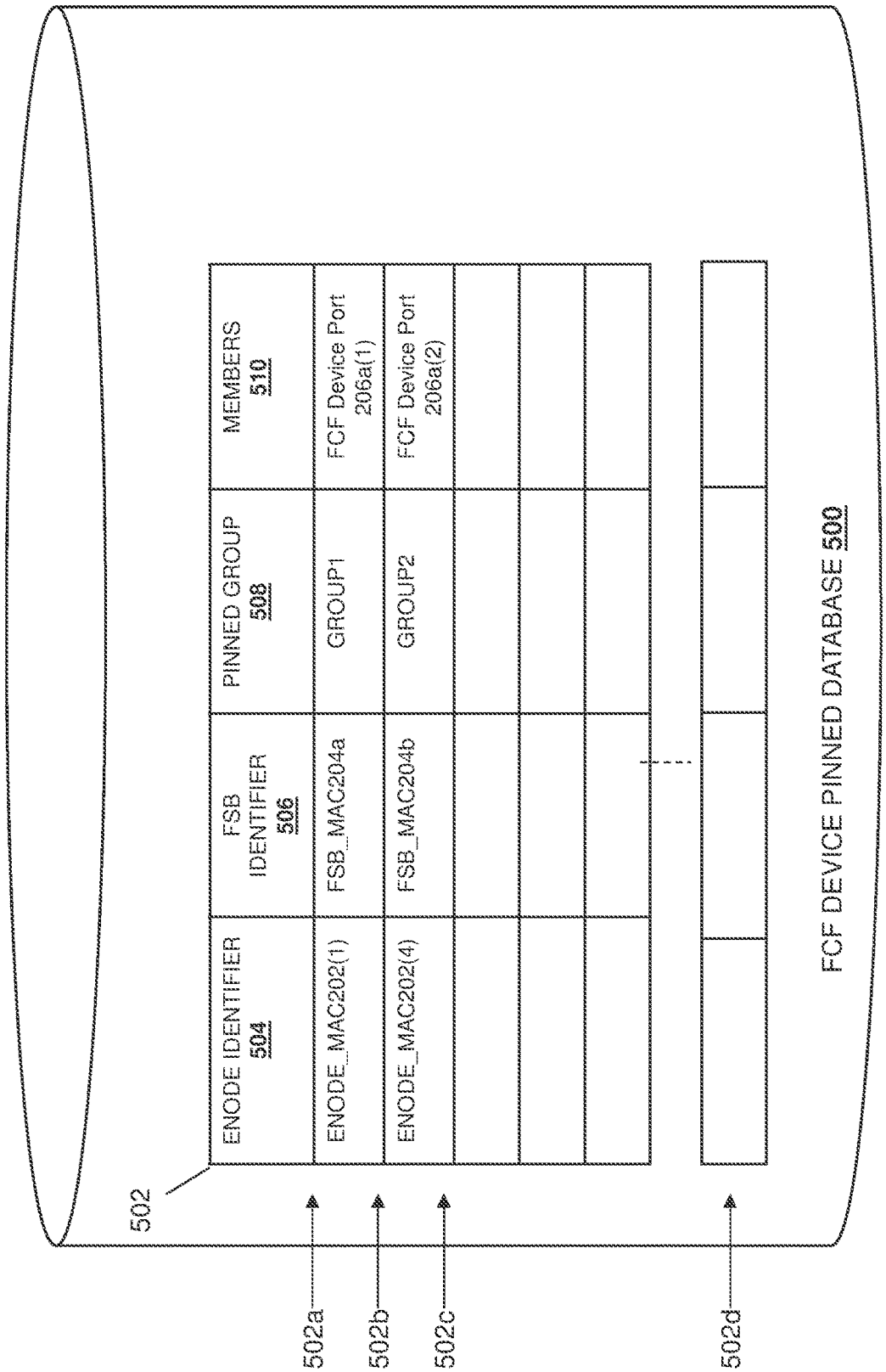

FIBRE CHANNEL OVER ETHERNET (FCOE) PINNING SYSTEM

CROSS REFERENCE TO RELATED APPLICATIONS

This application is related to United States Utility Application Ser. No. 16/138,626, filed Sep. 21, 2018, now U.S. Pat. No. 10,666,499, the disclosure of which is incorporated herein by reference in its entirety.

BACKGROUND

The present disclosure relates generally to information handling systems, and more particularly to Fibre Channel over Ethernet (FCoE) auto-pinning by information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems provide a Fibre Channel (FC) Storage Area Network (SAN) for the storage of data. In such systems, an FC switch may be utilized to couple the FC storage devices to servers via a FC Forwarder (FCF) that performs FC over Ethernet (FCoE)-to-FC protocol conversions on Ethernet communications sent from the servers to the FC storage devices, as well as FC-to-FCoE protocol conversions on FC communications sent from the FC storage devices to the servers. Such FCFs allow for servers that communicate via the Ethernet protocol to utilize FC SANs that communicate via the FC protocol. In some server/FCF configurations, multiple links may be provided between a server and an FCF, and those links may be aggregated using an aggregation protocol to provide an aggregated interface. For example, a port channel utilizing Virtual link Trunking (VLT), which is a link aggregation protocol available in devices provided by DELL® Inc. of Round Rock, Tex., United States, may be used to aggregate the links between FCFs and servers. To support FCoE along with an aggregation interface, a user may statically pin one of the ports in the aggregation interface for FCoE traffic per FC SAN by, for example, providing a command via a command line interface (CLI). In some implementations, the server may include a Converged Network Adapter (CNA) having four ports, with one port per FC SAN dedicated for Ethernet traffic, and only one port that is capable of being pinned for FCoE traffic per FC SAN. As such, using an aggregated interface, only two of the four ports on that CNA can be configured for FCoE traffic.

Similarly, one or more FCoE Initialization Protocol (FIP) snooping bridges (FSBs) may be provided between the server and the FCF, and may provide multiple links to the FCF that can be aggregated as an aggregated interface, as well as multiple links to the server device(s). The FSB may be dedicated to a particular SAN, but may be coupled to other FCFs of other SANs as well. However, in current implementations, only one of the ports in an aggregated interface to the FCF, which is provided for the SAN to which the FSB is dedicated, can be configured as an FCoE pinned port. Thus, when multiple links of an aggregated interface are provided between the server and the FSB (or between the FCF and the FSB), only one of those links may be pinned for FCoE traffic, which is inefficient as there is potential unused bandwidth on the additional links for that FCoE traffic.

Accordingly, it would be desirable to provide an improved FCoE pinning system.

SUMMARY

According to one embodiment, an Information Handling System (IHS) includes a plurality of ports; a processing system that is coupled to the plurality of ports; and a memory system that is coupled to the processing system and that includes instructions that, when executed by the processing system, cause the processing system to provide an Fibre Channel over Ethernet (FCoE) pinning engine that is configured to: send a Fibre Channel Forwarder (FCF) advertisement through a first port of the plurality of ports that is a member of an aggregated interface; receive, from a first server device at the first port in response to sending the FCF advertisement through the first port, a server message that includes a first server port identifier of a first server port; associate the first server port identifier with the first port to form a first FCF group; and pin the first FCF group for FCoE traffic.

BRIEF DESCRIPTION OF THE DRAWINGS

FIG. 9B is a diagram illustrating an embodiment of FCoE pinning during the method of FIG. 8.

FIG. 11B is a schematic view illustrating an embodiment of information being provided in the FCF device pinned database of FIG. 5 for the FCoE auto-pinning system of FIG. 2C during the method of FIG. 8.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
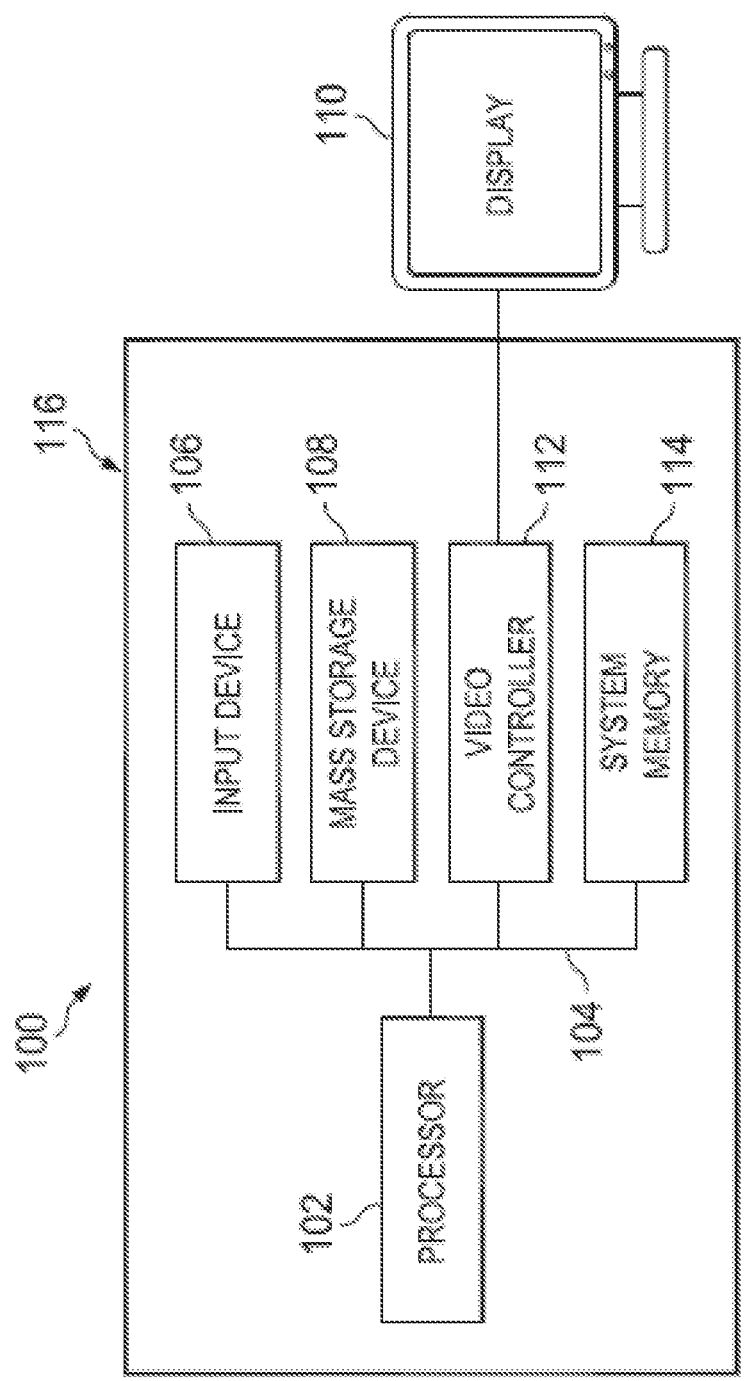
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
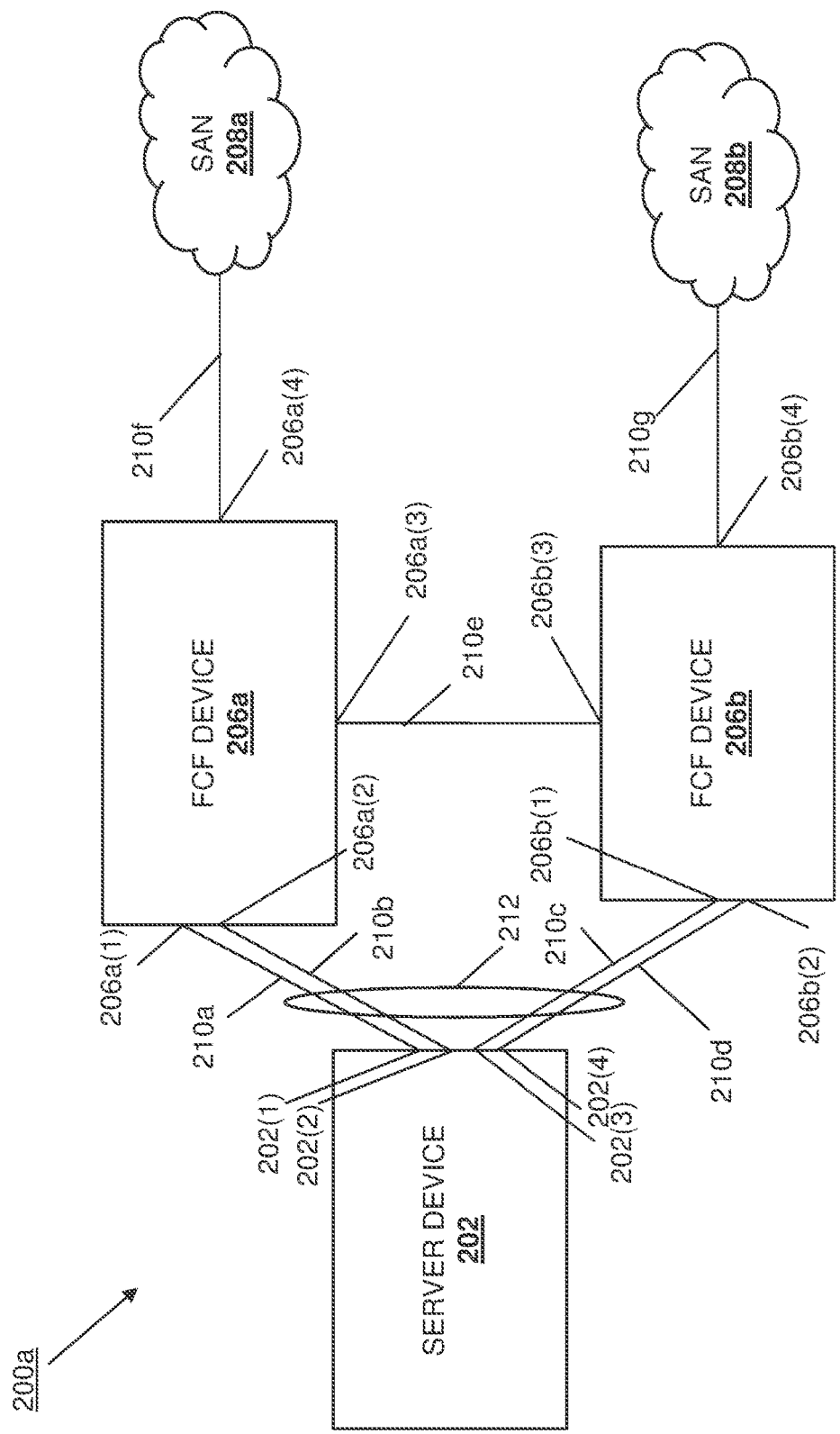
FIG. 2A is a schematic view illustrating an embodiment of a Fibre Channel over Ethernet (FCoE) pinning system.

Referring now to FIG. 2A, an embodiment of a Fibre Channel over Ethernet (FCoE) pinning system 200a is illustrated. In the illustrated embodiment, the FCoE pinning system 200 includes a server device 202 that may be the IHS 100 discussed above with reference to FIG. 1 and/or that may include some or all of the components of the IHS 100. For example, the server device 202 may be one or more servers in a server rack or server chassis, and one of skill in the art in possession of the present disclosure will recognize that any number of servers may be provided in the FCoE pinning system 200a and may operate similarly to the server devices discussed below. In the illustrated embodiment, the server device 202 is coupled to an FC Forwarder (FCF) device 206a that may be the IHS 100 discussed above with reference to FIG. 1 and/or that may include some or all of the components of the IHS 100. For example, the FCF device 206a may be provided by a switch or other networking device that is configured to receive Ethernet communications from the server device 202a, convert those Ethernet communications to Fibre Chanel (FC) communications for forwarding to an FC Storage Area Network (SAN), receive FC communications from the FC SAN, convert those FC communications to Ethernet communications for forwarding to the server device 202, and/or perform other FCF device functionality know in the art. One of skill in the art in possession of the present disclosure will recognize that any number of FCF devices, such as the FCF device 206b illustrated in FIG. 2A, may be provided in the FCoE pinning system 200a and operate similarly to the FCF device 206a.

In the illustrated embodiment, the FCF device 206a is coupled to an FC switch, an FC storage system, and/or any other FC networking device that may be included in an SAN 208a. For example, the FC SAN 208a may be configured to receive communications from the server device 202 that were converted as discussed above by the FCF device 206a, send communications to the server device that are converted as discussed above by the FCF device 206a, and/or perform a variety of other FC networking and storage system functionality that would be apparent to one of skill in the art in possession of the present disclosure. In various embodiments, the FCF device 206a may be coupled to a local area network (LAN) in order to send and receive Ethernet traffic via the LAN. In various embodiments, the FCF device 206a is included in a first virtual local area network for the SAN 208a.

In the illustrated embodiment, the FCF device 206b is coupled to an FC switch, an FC storage system, and/or any other FC networking device that may be included in an SAN 208b. For example, the FC SAN 208b may be configured to receive communications from the server device 202 that were converted as discussed above by the FCF device 206b, send communications to the server device that are converted as discussed above by the FCF device 206b, and/or perform a variety of other FC networking and storage system functionality that would be apparent to one of skill in the art in possession of the present disclosure. In various embodiments, the FCF device 206a may be coupled to a local area network (LAN) in order to send and receive Ethernet traffic via the LAN. In various embodiments, the FCF device 206b is included in a second virtual local area network for the SAN 208b. One of skill in the art in possession of the present disclosure will recognize that the FCF device 206a and the FCF device 206b may be coupled to the same upstream target device (e.g., an FC switch, an FC storage device, etc.) but belong to different SANs.

In the illustrated embodiment, the server device 202 may be connected with the FCF device 206a by a link 210a between a server port 202(1) and an FCF device port 206a(1), and by a link 210b between a server port 202(2) and an FCF device port 206a(2). Similarly, the server device 202 may be connected with the FCF device 206b by a link 210c between a server port 202(3) and an FCF device port 206b(1), and by a link 210d between a server port 202(4) and an FCF device port 206b(2). The links 210a-210d may be aggregated (e.g., via a port channel (also referred to as a VLT Link Aggregation Group (LAG) in VLT systems)) to provide an aggregated interface 212. The FCF device 206a may be connected to the FCF device 206b by a link 210e between an FCF device port 206a(3) and an FCF device port 206b(3). The link 210e may be an Inter-Chassis link (ICL) (also called a VLT interface (VLTi) in VLT systems) that may include a plurality of aggregated links. In the illustrated embodiment, the FCF device 206a may be connected to the FC SAN 208a by a link 210f through an FCF device port 206a(4), and the FCF device 206b may be connected to the FC SAN 208b by a link 210g through an FCF device port 206b(4). As would be understood by one of skill in the art in possession of the present disclosure, VLT is a proprietary aggregation protocol utilized by devices provided by DELL®, Inc. of Round Rock, Tex., United States, in order to allow an aggregated link with two different devices, although other aggregation protocols may benefit from the teachings of the present disclosure and thus are envisioned as falling within its scope as well.

Figure 2B:
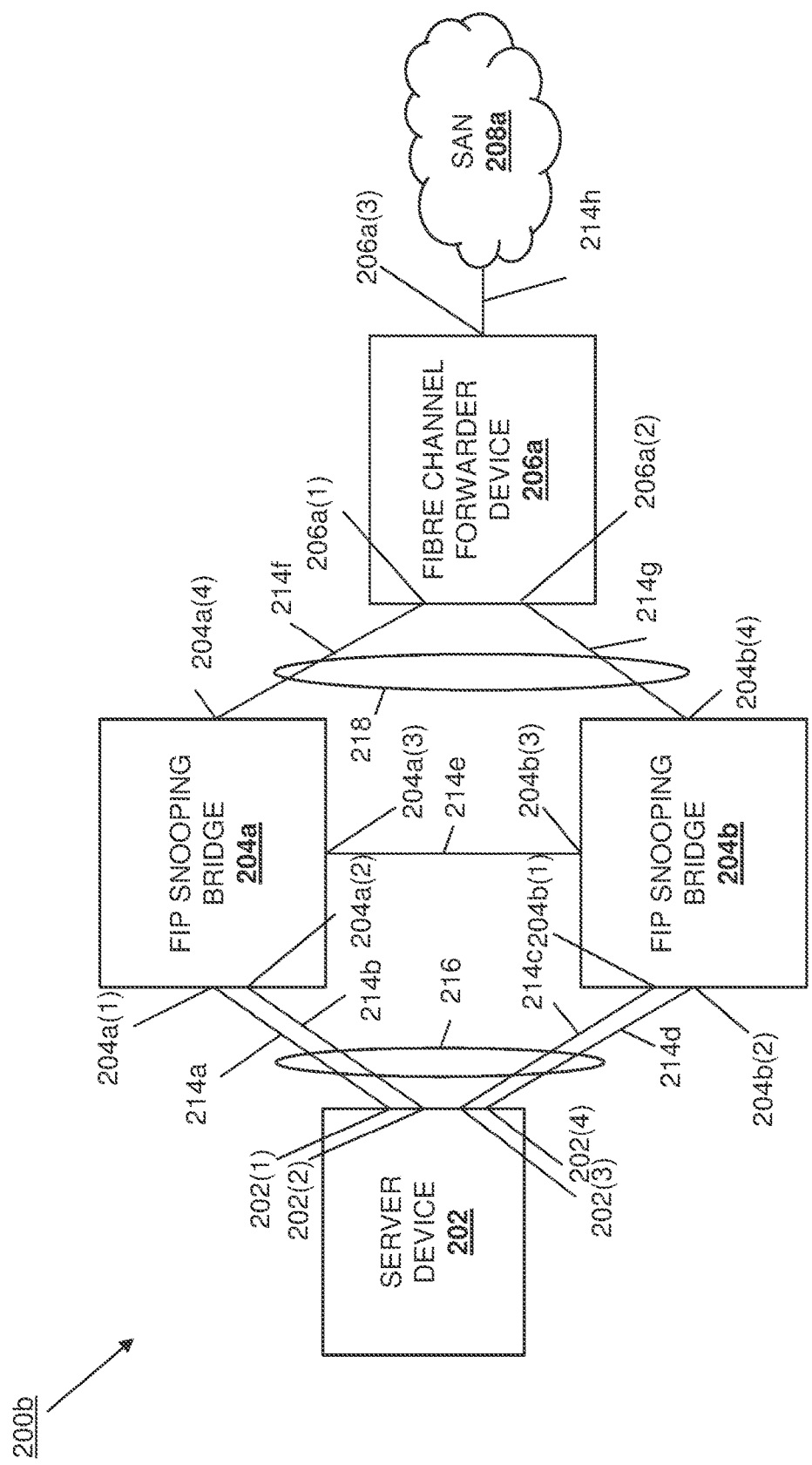
FIG. 2B is a schematic view illustrating an embodiment of an FCoE pinning system.

Referring now to FIG. 2B, an embodiment of an FCoE pinning system 200b is illustrated that may include the server device 202, the FCF device 206a, and the FC SAN 208a of the FCoE pinning system 200a described above with reference to FIG. 2A. In the illustrated embodiment, the server device 202 and the FCF device 206a are coupled to an FCoE Initialization Protocol (FIP) Snooping Bridge (FSB) 204a that may be the IHS 100 discussed above with reference to FIG. 1 and/or that may include some or all of the components of the IHS 100. For example, the FSB 204a may be provided by a switch or other networking device that is configured to snoop on FIP packets during the discovery and login phases of end nodes in order to, for example, implement data integrity mechanisms using access control lists (ACLs) that permit valid FCoE traffic between an ENode and the FCF device 206a, as well as other FSB functionality that would be apparent to one of skill in the art in possession of the present disclosure. One of skill in the art in possession of the present disclosure will recognize that any number of FSBs, such as the FSB 204b illustrated in FIG. 2B, may be provided in the FCoE pinning system 200b and may operate similarly to the FSB 204a. As discussed below, the server device 202a may include a four port Converged Network Adapter (CNA), with each port being an FCoE node (ENode).

In the illustrated embodiment, a first SAN/VLAN may include the server device 202, the FCF device 206a, and the FSB 204a. The server device 202 may be connected with the FSB 204a by a link 214a between a server port 202(1) and an FSB port 204a(1), and by a link 214b between a server port 202(2) and an FSB port 204a(2). A second SAN/VLAN may include the server device 202, the FCF device 206a, and the FSB 204b. The server device 202 may be connected with the FSB 204b by a link 214c between a server port 202(3) and an FSB port 204b(1), and by a link 214d between a server port 202(4) and an FSB port 204b(2). The links 214a-214d may be aggregated (e.g., using a port channel) to provide an aggregated interface 216. The FSB 204a may be connected to the FSB 204b by a link 214e between an FSB port 204a(3) and an FSB port 204b(3). The link 214e may be an ICL (e.g., a VLTi in VLT systems) that may include a plurality of aggregated links. In the illustrated embodiment, the FSB 204a may be connected to the FCF device 206a by a link 214f between an FSB port 204a(4) and the FCF device port 206a(1). The FSB 204b may be connected to the FCF device 206a by a link 214g between an FSB port 204b(4) and the FCF device port 206b(1). The links 214f and 214g may be aggregated to provide an aggregated interface 218. The FCF device 206a may be connected to the FC SAN 208a by a link 214h through the FCF device port 206a(3).

While the aggregated interface 216 in the FCoE pinning system 200b is illustrated as having four links between the server device 202 and the FSBs 204a and 204b, one of skill in the art in possession of the present disclosure would recognize that the aggregated interface 216 may include more or fewer links. For example, and with reference to FIG. 2C, an FCoE pinning system 200c is illustrated that is substantially similar to the FCoE pinning system 200b of FIG. 2B, but with the aggregated interface 216 including only two links: the link 214a between the server port 202(1) and the FSB port 204a(1), and the link 214d between the server port 202(4) and the FSB port 204b(2).

Similarly, while the aggregated interface 218 includes links 214f and 214g, one of skill in the art in possession of the present disclosure would recognize that there may be additional links between the FSB 204a and the FCF device 206a, and/or between the FSB 204b and the FCF device 206a. For example and referring now to FIG. 2D, an FCoE pinning system 200d is illustrated where the FSB 204a, the FSB 204b, the FCF device 206a, and the FCF device 206b are configured in a square topology. In the illustrated embodiment, a first SAN/VLAN may include the server device 202, the FCF device 206a, and the FSB 204a, and a second SAN/VLAN may include the server device 202, the FCF device 206b, and the FSB 204b. The server device 202 may be connected with the FSB 204a by the link 214a between the server port 202(1) and the FSB port 204a(1). The server device 202 may be connected with the FSB 204b by the link 214d between a server port 202(4) and an FSB port 204b(2). The links 214a and 214d may be aggregated to provide the aggregated interface 216. The FSB 204a may be connected to the FSB 204b by a link 214e between an FSB port 204a(3) and an FSB port 204b(3). The link 214e may be an ICL and may include a plurality of aggregated links.

In the illustrated embodiment, the FSB 204a may be connected to the FCF device 206a by the link 214f between the FSB port 204a(4) and the FCF device port 206a(1). The FSB 204a may also be connected to the FCF device 206a by a link 214g between the FSB port 204a(5) and the FCF device port 206a(2). The FSB 204a may be connected to the FCF device 206b by a link 214h between an FSB port 204a(6) and the FCF device port 206b(1). The FSB 204b may be connected to the FCF device 206a by a link 214i between the FSB port 204b(4) and the FCF device port 206a(3). The FSB 204b may be connected to the FCF device 206b by a link 214j between the FSB port 204b(5) and the FCF device port 206b(2). The links 214f-214j may be aggregated to provide the aggregated interface 218. The FCF device 206a may be connected to the FCF device 206b by a link 214l between the FCF device port 206a(4) and the FCF device port 206b(3). The link 214l may be an ICL and may include a plurality of aggregated links. The FCF device 206a may be connected to the FC SAN 208a by a link 214m through an FCF device port 206a(5). The FCF device 206b may be connected to the FC SAN 208a by a link 214n through an FCF device port 206b(4). While specific FCoE pinning systems 200a-200d have been illustrated and described, one of skill in the art in possession of the present disclosure will recognize that the teachings of the present disclosure will be beneficial for a variety of FCoE pinning systems that would be apparent to one of skill in the art in possession of the present disclosure and, as such, a wide variety of modifications to the number, types, and orientation of devices in the FCoE pinning systems 200a-200d will fall within the scope of the present disclosure as well.

Figure 2C:
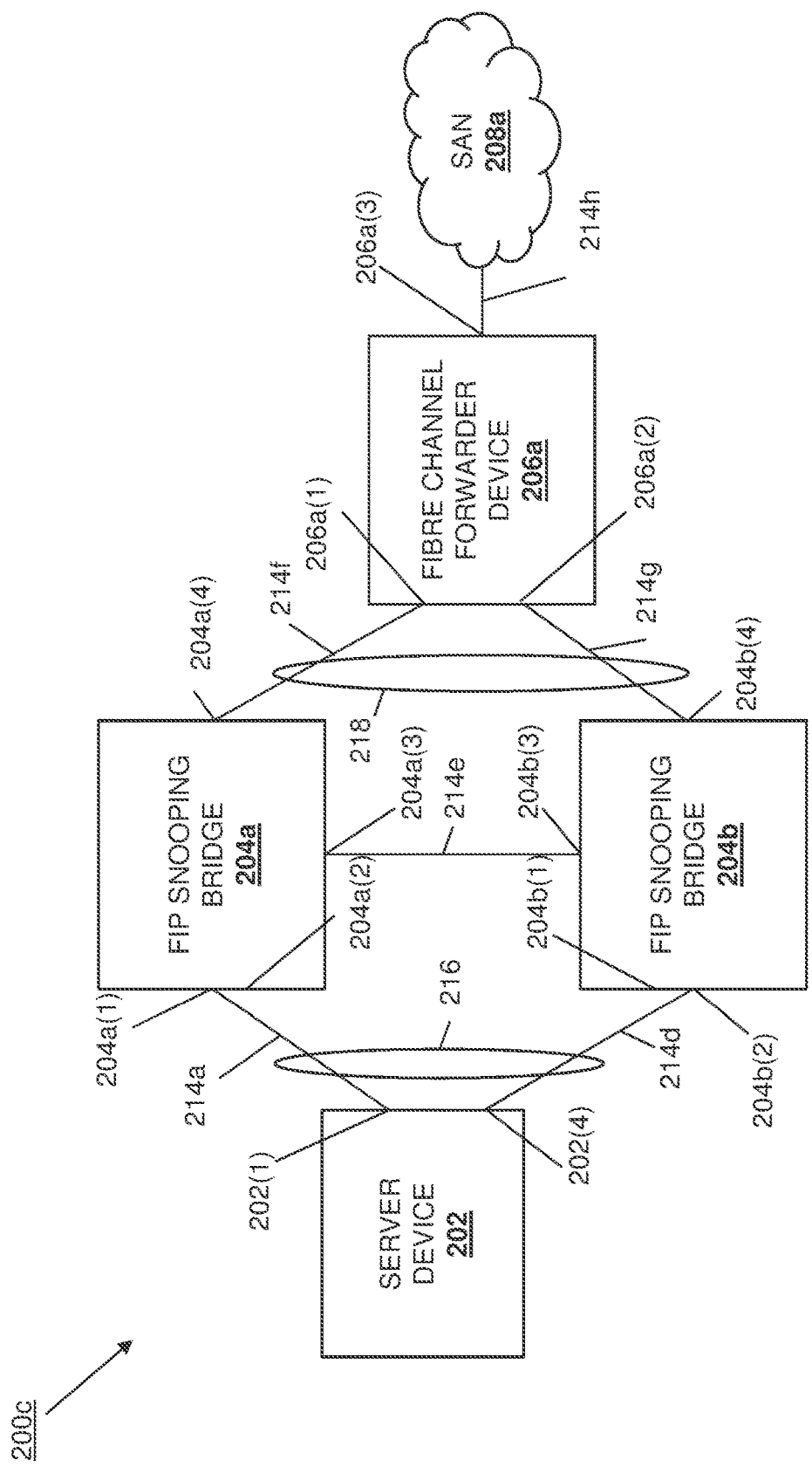
FIG. 2C is a schematic view illustrating an embodiment of an FCoE pinning system.
Figure 2D:
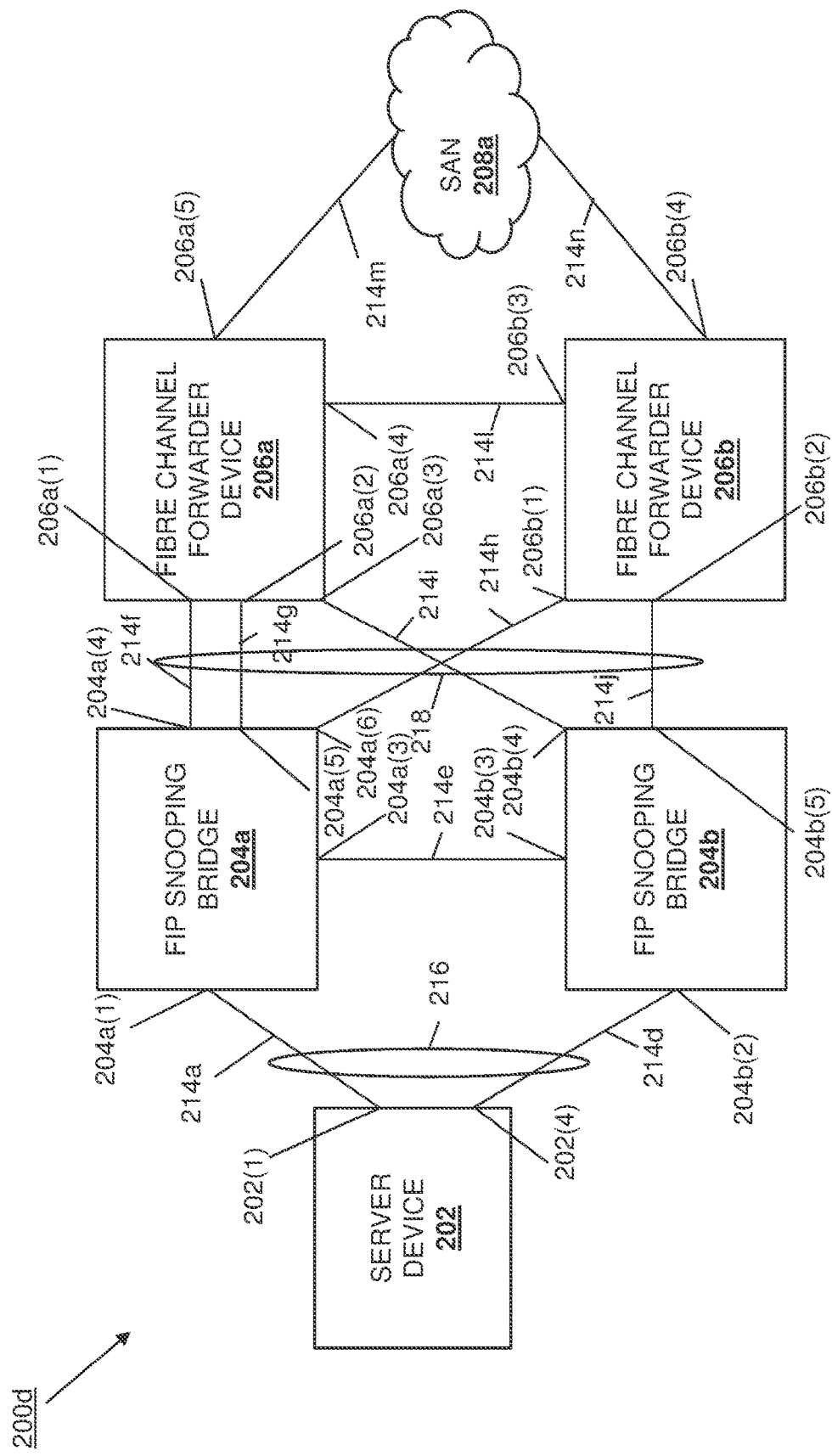
FIG. 2D is a schematic view illustrating an embodiment of an FCoE pinning system.
Figure 3:
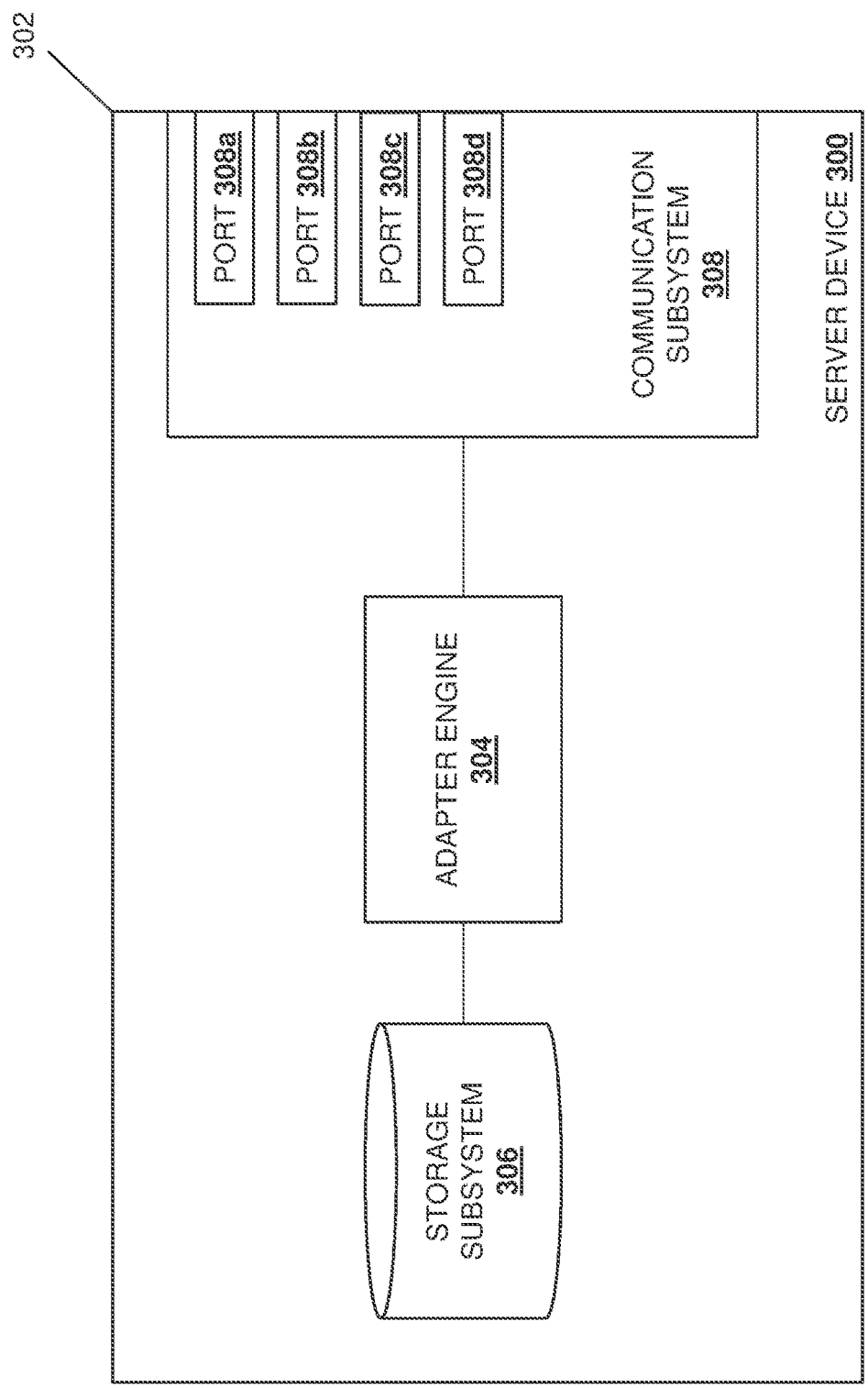
FIG. 3 is a schematic view illustrating an embodiment of a server device in the FCoE pinning systems of FIGS. 2A-2D.

Referring now to FIG. 3, an embodiment of a server device 300 is illustrated that may be the server device 202 discussed above with reference to FIGS. 2A-2D. As such, the server device 300 may be the IHS 100 discussed above with reference to FIG. 1 and/or may include some or all of the components of the IHS 100, and in specific examples may be one or more servers in a server rack or server chassis. In the illustrated embodiment, the server device 300 includes a chassis 302 that houses the components of the server device 300, only some of which are illustrated in FIG. 3. For example, the chassis 302 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide an adapter engine 304 that is configured to perform the functions of the adapter engines and server devices discussed below.

The chassis 302 may also house a storage system (not illustrated, but which may include the storage device 108 discussed above with reference to FIG. 1) that is coupled to the adapter engine 304 (e.g., via a coupling between the storage system and the processing system) and that may include a storage subsystem 306 that is configured to store the data utilized as discussed below. However, in some embodiments the storage subsystem 306 may be omitted. The chassis 302 may also house a communication subsystem 308 that is coupled to the adapter engine 304 (e.g., via a coupling between the communication subsystem 308 and the processing system) and that may include a Network Interface Controller (NIC), a wireless communication devices, one or more ports (e.g., a port 308a), and/or other communication components that would be apparent to one of skill in the art in possession of the present disclosure. Furthermore, in some embodiments, components of the adapter engine 304 and/or the communication subsystem 308 may be provided by a Converged Network Adapter (CNA) that performs the functionality of the adapter engines and/or server devices discussed below. In various embodiments, the CNA may be a four port CNA that includes a port 308a, a port 308b, a port 308c, and a port 308d, which may be the ports 202a-202d discussed above with reference to FIGS. 2A-2D. However, in other embodiments, the adapter engine 304 and/or communication subsystem 308 may be utilized to provide any number of ports and other types of adapters (e.g., Host Bus Adapters (HBAs)) while remaining within the scope of the present disclosure. While a specific server device 300 has been described, one of skill in the art in possession of the present disclosure will recognize that the server device 300 may include a variety of other components that perform conventional server device functionality, as well as the functionality described below, while remaining within the scope of the present disclosure.

Figure 4:
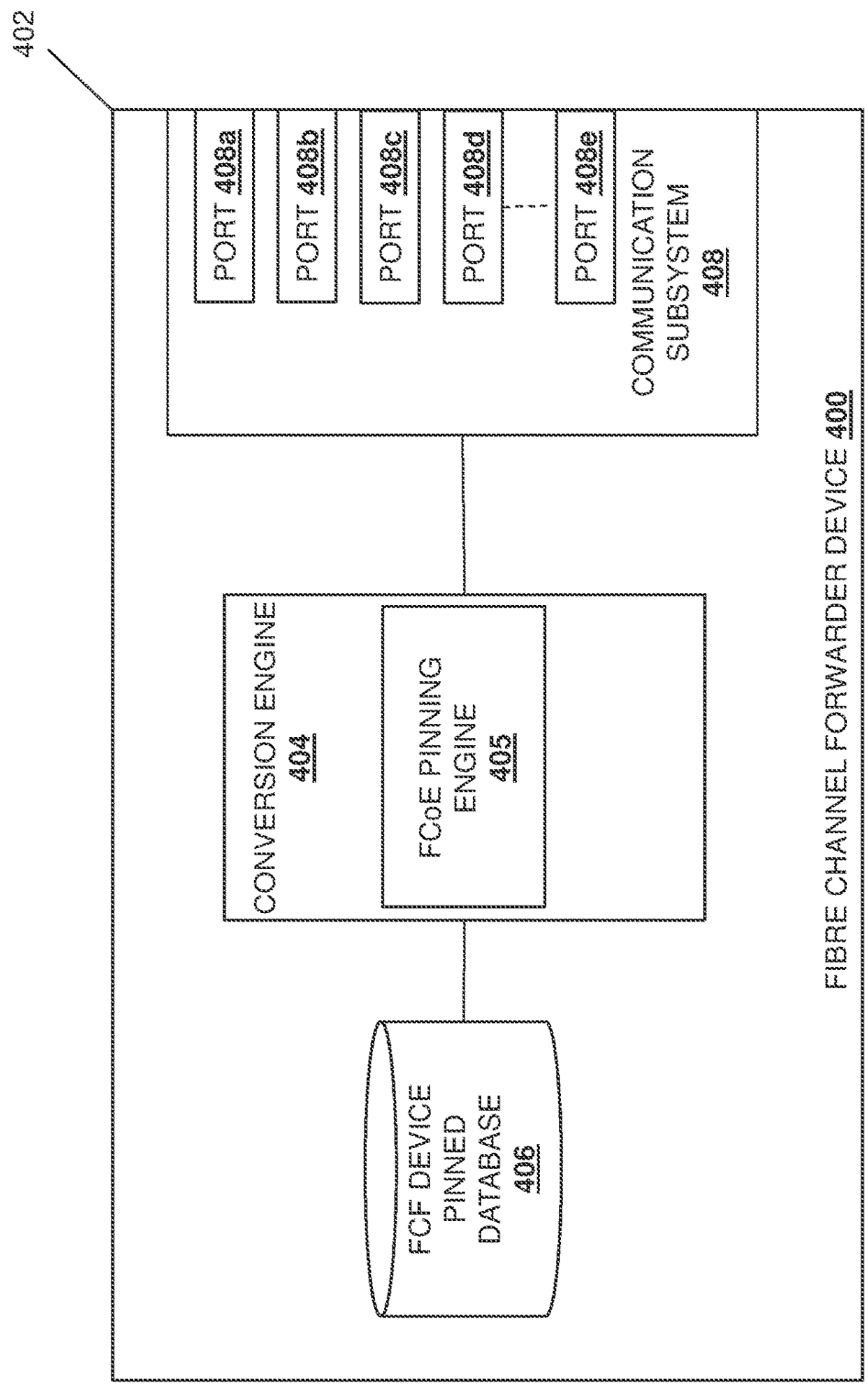
FIG. 4 is a schematic view illustrating an embodiment of an FCF device in the FCoE pinning systems of FIGS. 2A-2D.

Referring now to FIG. 4, an embodiment of a Fibre Channel Forwarder (FCF) device 400 is illustrated that may be the FCF devices 206a and 206b discussed above with reference to FIGS. 2A-2D. As such, the FCF device 400 may be the IHS 100 discussed above with reference to FIG. 1 and/or may include some or all of the components of the IHS 100, and in specific examples may be a switch, a gateway, or other networking device. In the illustrated embodiment, the FCF device 400 includes a chassis 402 that houses the components of the FCF device 400, only some of which are illustrated in FIG. 4. For example, the chassis 402 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a conversion engine 404 that is configured to perform the functions of the conversion engines and FCF devices discussed below. In a specific example, the conversion engine 404 may include an N_Port ID Virtualization (NPIV) Proxy Gateway (NPG) engine that operates as discussed below, although other conversion engines may fall within the scope of the present disclosure as well. In another example, the conversion engine 404 may include an FCoE pinning engine 405 that is configured to perform the functions of the FCoE pinning engines and FCF devices discussed below such as, for example, pinning one or more ports that are included in a port interface/aggregated interface for FCoE traffic, as discussed in detail below.

The chassis 402 may also house a storage system (not illustrated, but which may include the storage device 108 discussed above with reference to FIG. 1) that is coupled to the conversion engine 404 (e.g., via a coupling between the storage system and the processing system) and that may include an FCF device pinned database 406 that is configured to store the data utilized by the configuration engine 404 as discussed below. The chassis 402 may also house a communication subsystem 408 that is coupled to the conversion engine 404 (e.g., via a coupling between the communication subsystem 408 and the processing system) and that may include a Network Interface Controller (NIC), a wireless communication devices, ports, and/or other communication components that would be apparent to one of skill in the art in possession of the present disclosure. For example, in the illustrated embodiment, the communication subsystem 408 includes a plurality of ports (e.g., the ports 408a, 408b, 408c, 408d, and up to 408e illustrated in FIG. 4) that may be coupled to an FC networking device, another FCF device, an FSB, and/or a server device as discussed below. The ports 408a-408e may be any of the FCF device ports 206a(1)-206a(5) or 206b(1)-206b(5) discussed above with reference to FIGS. 2A-2D. Furthermore, in some embodiments, components of the conversion engine 404 and/or the communication subsystem 408 may provide an NPG that performs the functionality of the conversion engines and/or server devices discussed below. However, as discussed above, the conversion engine 404 may be utilized to provide for other types of conversions while remaining within the scope of the present disclosure. While a specific FCF device 400 has been described, one of skill in the art in possession of the present disclosure will recognize that the FCF device 400 may include a variety of other components that perform conventional FCF device functionality, as well as the functionality described below, while remaining within the scope of the present disclosure.

Figure 5:
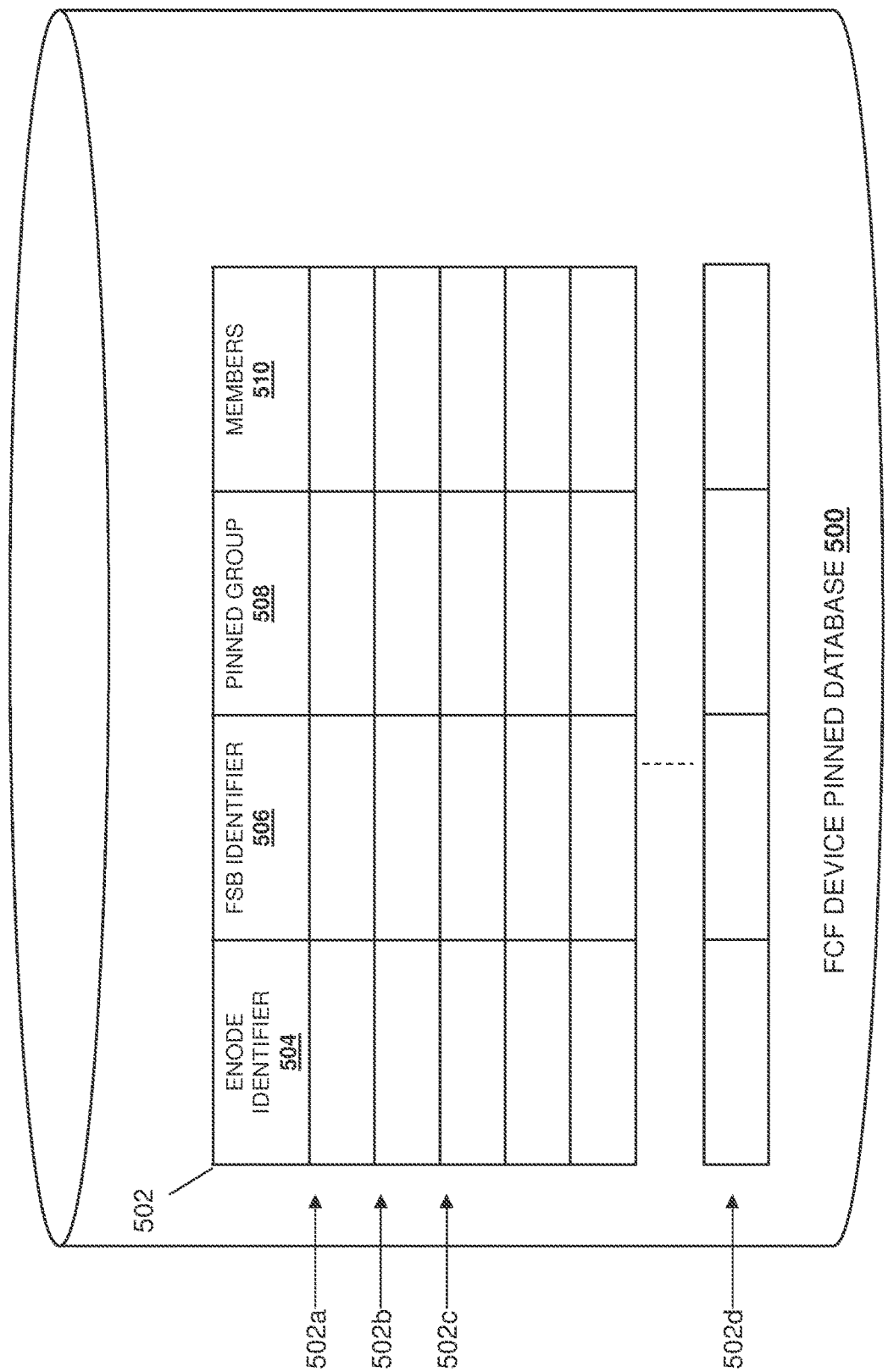
FIG. 5 is a schematic view illustrating an embodiment of an FCF device pinned database in the FCF devices of FIGS. 2A-2D.

Referring now to FIG. 5, an embodiment of an FCF device pinned database 500 is illustrated. In an embodiment, the FCF device pinned database 500 may be the FCF device pinned database 406 discussed above with reference to FIG. 4. In a specific example, the FCF device pinned database 500 may include an FCF device pinning table 502 that may identify, for example, FCF device ports of the FCF device 400 that are grouped and pinned for FCoE traffic based on the aggregated interface (e.g., a port channel) in which the FCF device ports are members. In the illustrated example, the FCF device pinned database 500 includes the FCF device pinning table 502 having FCF device pinning table entries 502a, 502b, 502c, and up to 502d. For example, for each FCF device pinning table entry 502a-d, the FCF device pinning table 502 may include an ENode identifier column 504, an FSB identifier column 506, a pinned group identifier column 508, a member column 510 for FCF device ports that are members of the aggregated interface, and/or any other information column that would be apparent to one of skill in the art to pin FCF device ports of the FCF device 206a and/or 206b for FCoE traffic. However, one of skill in the art in possession of the present disclosure will recognize that the FCF device pinned database 500 and/or the FCF device pinning table 502 may include and/or store other information to enable the functionality discussed below while remaining within the scope of the present disclosure.

Figure 6:
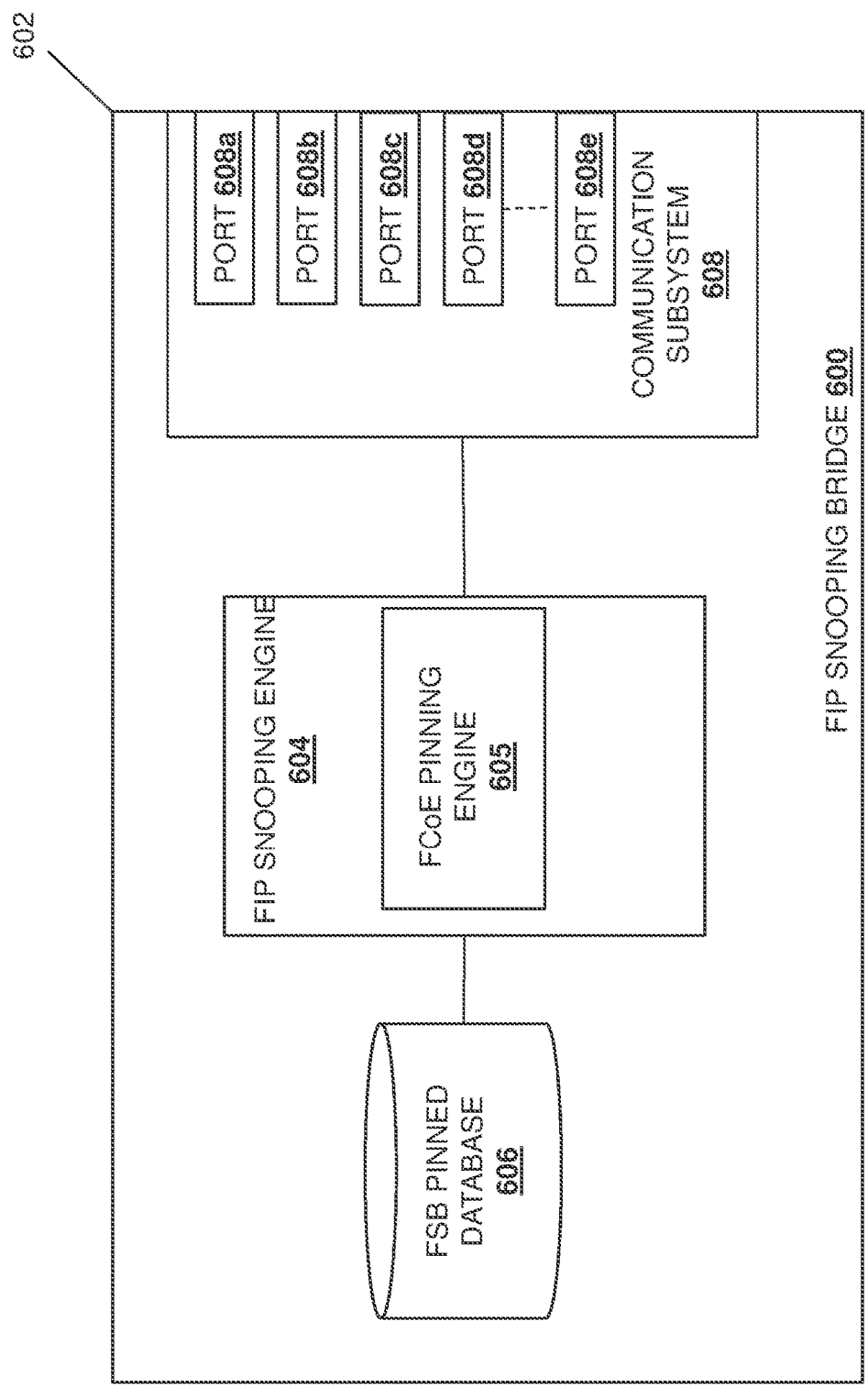
FIG. 6 is a schematic view illustrating an embodiment of an FCoE Initialization Protocol (FIP) Snooping Bridge (FSB) in the FCoE pinning systems of FIGS. 2A-2D.

Referring now to FIG. 6, an embodiment of an FCoE Initialization Protocol (FIP) Snooping Bridge (FSB) 600 is illustrated that may be the FSB 204a or 204b discussed above with reference to FIGS. 2A-2D. As such, the FSB 600 may be the IHS 100 discussed above with reference to FIG. 1 and/or may include some or all of the components of the IHS 100, and in specific examples may be an FCoE transit switch or FCF device. In the illustrated embodiment, the FSB 600 includes a chassis 602 that houses the components of the FSB 600, only some of which are illustrated in FIG. 6. For example, the chassis 602 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide an FIP snooping engine 604 that is configured to perform the functions of the FIP snooping engines and FSBs discussed below. The chassis 602 may also house a storage system (not illustrated, but which may include the storage device 108 discussed above with reference to FIG. 1) that is coupled to the FIP snooping engine 604 (e.g., via a coupling between the storage system and the processing system) and that may include an FSB pinned database 606 that is configured to store the data utilized as discussed below. In another example, the FIP snooping engine 604 may include an FCoE pinning engine 605 that is configured to perform the functions of the FCoE pinning engines and FSBs discussed below such as, e.g., pinning one or ports of the FSB that are included in a port interface/aggregated interface, as discussed in detail below.

The chassis 602 may also house a communication subsystem 608 that is coupled to the FIP snooping engine 604 (e.g., via a coupling between the communication subsystem 608 and the processing system) and that may include a Network Interface Controller (NIC), a wireless communication devices, ports, and/or other communication components that would be apparent to one of skill in the art in possession of the present disclosure. For example, in the illustrated embodiment, the communication subsystem 608 includes a plurality of ports 608a, 608b, 608c, 608d, and up to 608e, any of which may be coupled to an FCF device as well as a server device, as discussed herein. The ports 608a-608e may be any of the FSB ports 204a(1)-204a(6) or 204b(1)-204b(5) discussed above with reference to FIGS. 2A-2D. While a specific FSB 600 has been described, one of skill in the art in possession of the present disclosure will recognize that the FSB 600 may include a variety of other components that perform conventional FC networking device functionality, as well as the functionality described below, while remaining within the scope of the present disclosure.

Figure 7:
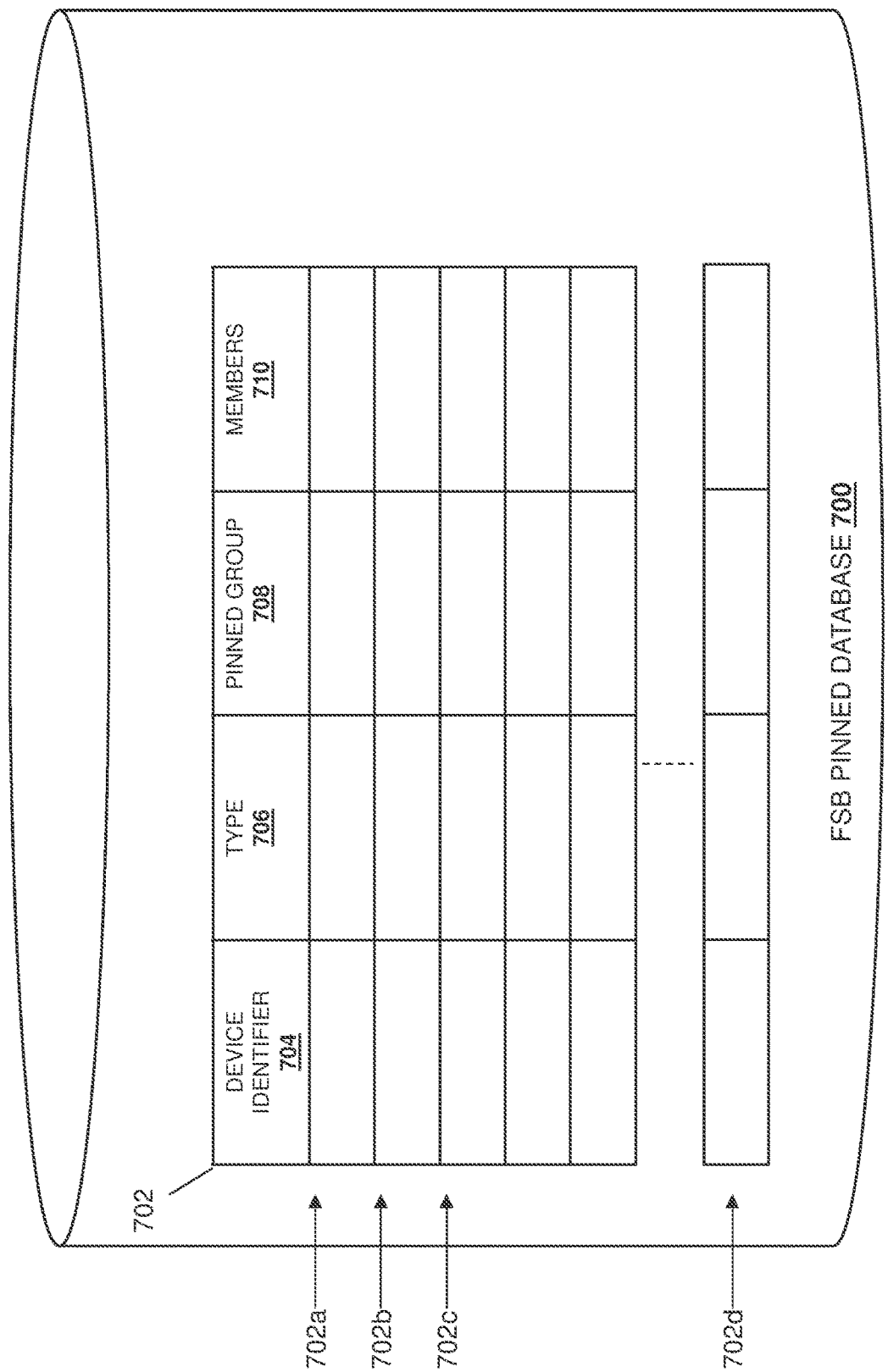
FIG. 7 is a schematic view illustrating an embodiment of an FSB pinned database in the FSB of FIG. 2A-2D.

Referring now to FIG. 7, an embodiment of an FSB pinned database 700 is illustrated. In an embodiment, the FSB pinned database 500 may be the FSB pinned database 606 discussed above with reference to FIG. 6. In a specific example, the FSB pinned database 700 may include an FSB pinning table 702 that may identify, for example, FSB ports of the FSB 600 that are grouped and pinned for FCoE traffic based on the aggregated interface (e.g., a port channel) in which the FSB ports are members. In the illustrated example, the FSB pinned database 700 includes the FSB pinning table 702 having FSB pinning table entries 702a, 702b, 702c, and up to 702d. For example, for each FSB pinning table entry 702a-d, the FSB pinning table 702 may include an connected device identifier column 704, an connected device type column 706 (e.g., an ENode or an FCF device), a pinned group identifier column 708, a member column 710 for FSB ports that are members of the aggregated interface, and/or any other information column that would be apparent to one of skill in the art to pin FSB ports of the FSBs 204a and/or 204b for FCoE traffic. However, one of skill in the art in possession of the present disclosure will recognize that the FSB pinned database 700 and/or the FSB pinning table 702 may include and/or store other information to enable the functionality discussed below while remaining within the scope of the present disclosure.

Figure 8:
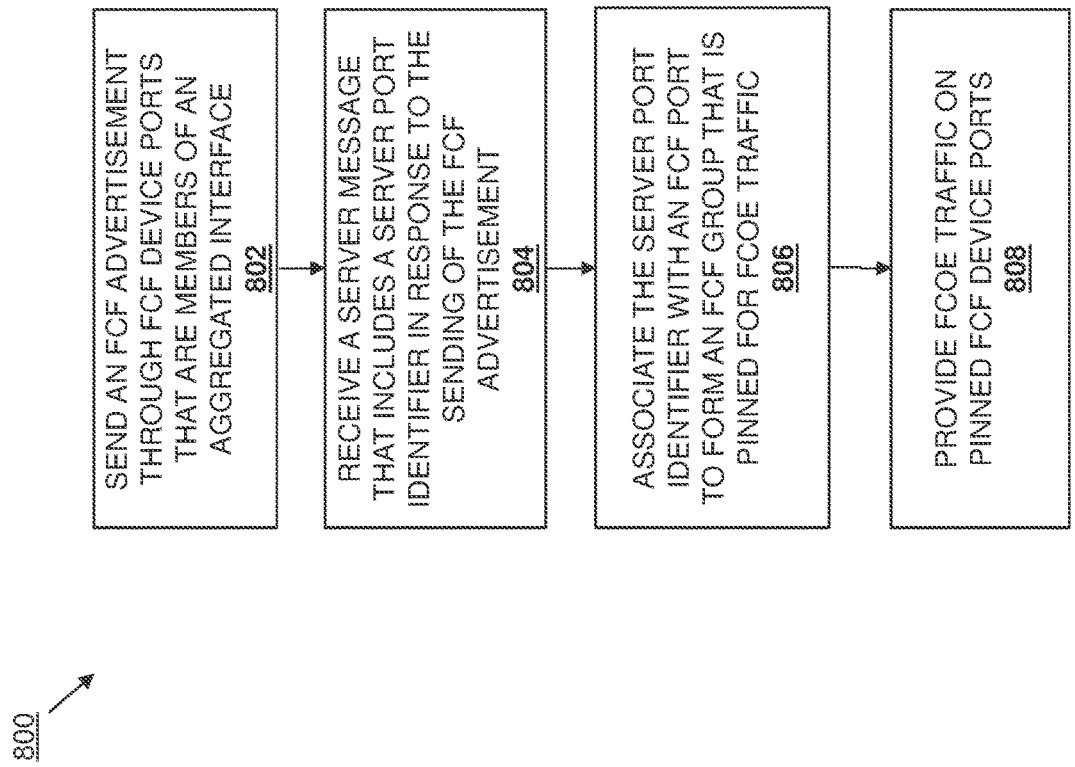
FIG. 8 is a flow chart illustrating an embodiment of a method for providing FCoE pinning.

Referring now to FIG. 8, an embodiment of a method 800 for FCoE pinning is illustrated. As discussed above, in conventional systems that support FCoE and that utilize an aggregation protocol (e.g., VLT) that aggregates links between an ENode, an FCF device and, in some embodiments, an FSB in order to provide an aggregated interface (e.g., a port channel also referred to as a VLT LAG), an administrator has to statically pin one of the ports in the aggregated interface for FCoE traffic per SAN fabric, and that administrator must configure the port to be pinned via a Command Line Interface (CLI). However, this manual pinning configuration of ports for FCoE traffic is inefficient when there are multiple links in a SAN that are included in the aggregated interface. For example, if there are multiple links between an FSB and an FCF device provided in a SAN and/or VLAN, only one set of ports (i.e., a single FSB port and a single FCF device port that provide a link) that are members of the aggregated interface may be configured as an FCoE pinned port. Furthermore, in conventional FCoE pinning systems, four port CNAs can only have one of those ports used for FCoE traffic per SAN fabric, and required one of those ports to be dedicated to Ethernet traffic. As such, out of the four ports on the CNA, only two ports of the CNA can be pinned for FCoE traffic (converged traffic cannot be used when using aggregated interfaces due to the one port pinning limit.) The systems and methods of the present disclosure provide an FCoE pinning system that automatically pins ports for FCoE traffic if the ports are members of an aggregated interface. Pinning tables are generated by FCFs and FSBs that group together multiple links that are pinned as groups such that FCoE traffic can be routed through all ports and links that are part of the aggregated interface. Thus, the pinning tables and the FCoE pinning discussed herein decreases latency with respect to the FCoE traffic being sent, allows for converged traffic from a four port CNA where the ports of the CNA are aggregated, alleviates congestion on the links between the an ENode and an FC storage device, and/or provides other benefits that will be apparent to one of skill in the art in possession of the present disclosure when additional links between an ENode and a FCF device are utilized for FCoE traffic.

The method 800 begins at block 802 where an FCF advertisement is sent through FCF device ports that are members of an aggregated interface. In an embodiment of block 802, the FCF device 206a and/or 206b of FIGS. 2A-2D may send an FCF advertisement though each FCF device port that is a member of the aggregated interface 212 of FIG. 2A and/or the aggregated interface 218 of FIGS. 2B-2D (e.g., a port channel (i.e., a VLT LAG)). Each FCF advertisement may include an FCF device identifier (e.g., an FCF Media Access Control (MAC) address) that identifies the FCF device from which the FCF identifier originated.

Figure 9A:
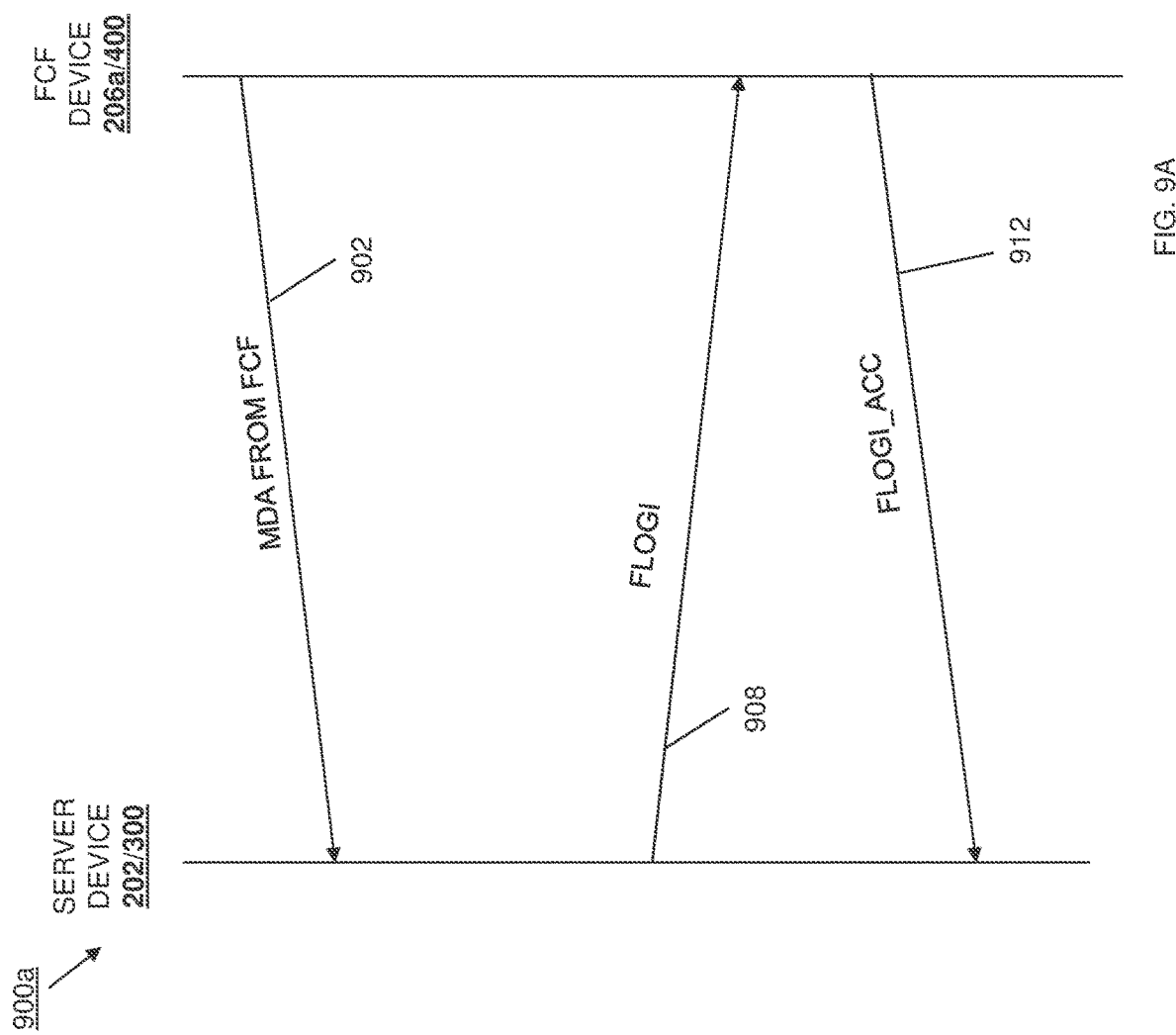
FIG. 9A is a diagram illustrating an embodiment of FCoE pinning during the method of FIG. 8.

Referring now to FIG. 9A, an example FCoE pinning communication diagram 900a illustrates the communications between the server device 202/400 and the FCF device 206a/400 during the method 800. The FCoE pinning communication diagram 900a is discussed with reference to the FCoE pinning system 200a of FIG. 2A. In the illustrated example, FCF device 206a sends a multicast discovery advertisement (MDA) 902 through each of: the FCF device port 206a(1) via the link 210a, and the FCF device port 206a(2) via the link 210b, each of which are members of the aggregated interface 212. Each MDA 902 may include an FCF MAC address that identifies the FCF device 206a. The corresponding server ports 202(1) and 202(2) may receive the MDA 902. While the examples in FIG. 9A are directed to the communications between the FCF device 206a and server device 202, one of skill in the art in possession of the present disclosure will recognize that the methods herein may be applied to communications between the FCF device 206b and the server device 202 while remaining within the scope of the present disclosure and are omitted to simplify the discussion.

Referring now to FIG. 9B, an example FCoE pinning communication diagram 900b illustrates communications between the server device 202/300 and the FSB 204a/600, and between the FSB 204a/600 and the FCF device 206a/400, during the method 800. FCoE pinning communication diagram 900b is discussed with reference to the FCoE pinning systems 200b-200d of FIGS. 2B-2D. In the illustrated example, the FCF device 206a sends an MDA 902 through each of: the FCF device port 206a(1) via the link 214f, and the FCF device port 206a(2) via the link 214g of FIGS. 2B and 2C, each of which are members of the aggregated interface 212. In the FCoE pinning system 200d of FIG. 2D, the FCF device 206a sends the MDA 902 through the FCF device ports 206a(1), 206a(2), and 206a (3). Each MDA 902 may include an FCF MAC address that identifies the FCF device 206a. The corresponding FSB ports 204a(4) and 204a(5) on the FSB 204a may receive the MDA 902. While the examples in FIG. 9B are directed to the communications between the FCF device 206a and the FSB 204a, one of skill in the art in possession of the present disclosure will recognize that the methods herein may be applied to communications between the FCF device 206a and the FSB 204b and/or between FCF device 206b and the FSBs 204(a) and 204(b) while remaining within the scope of the present disclosure and are omitted to simplify the discussion.

In response to receiving the FCF advertisement, the FSB 204(a) may associate the FCF device identifier included in the FCF advertisement with the FSB port that received the FCF advertisement in order to form a first FSB group and pin the first FSB group for FCoE traffic. Additional FSB ports may also be added to the same FSB group based on whether those FSB ports received an FCF advertisement with the same FCF device identifier. In an embodiment of block 802, and with reference to the FSB pinned database 700 of FIGS. 10A, 11A, and 12A, the FCoE pinning engine 605 may generate one or more FSB pinning tables 702. For example, the FC device 206a of the FCoE pinning system 200b in FIG. 2B may maintain an FSB pinning table 702 in the FSB pinned database 700 of FIG. 10A that provides the pinned group members of FSB ports. Because only the link 214f is provided between FSB 204a and FCF device 206a, the FSB 204 may only receive the MDA 902 that includes the FCF device MAC address for the FCF device 206a on the FSB port 204a(4). The FCF device MAC address of the FCF device 206a may be associated FSB port 204a(4) upon which the FSB 204a received the MDA 902. For example, the FSB pinning table entry 702a of the FSB pinning table 702 illustrates how the FCoE pinning engine 605 may operate to pin the FSB port 204a(4) with FCoE traffic by associating the FCF device identifier of the FCF device 206a ("FCF_MAC206a") to an FSB port identifier ("FSB port 204a(4)").

Figure 11A:
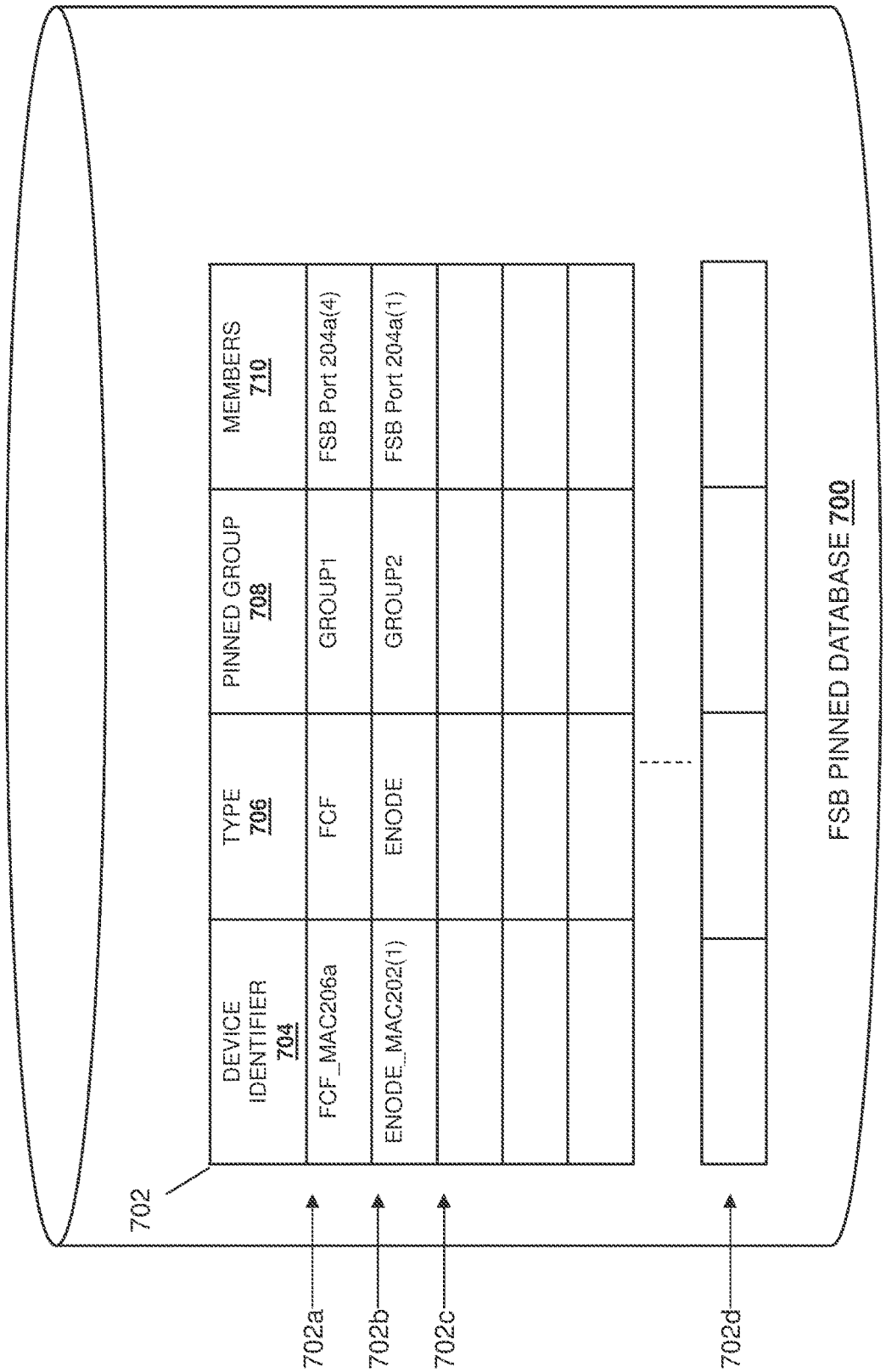
FIG. 11A is a schematic view illustrating an embodiment of information being provided in the FSB pinned database of FIG. 7 for the FCoE auto-pinning system of FIG. 2C during the method of FIG. 8.

In another example and with reference to the FSB 204a of the FCoE pinning system 200c in FIG. 2C, the FSB 204a may maintain an FSB pinning table 702 in the FSB pinned database 700 of FIG. 11A that provides the pinned group members of FSB ports. Because only the link 214f is provided between FSB 204a and FCF device 206a, the FSB 204 may only receive the MDA 902 that includes the FCF device MAC address for the FCF device 206a on the FSB port 204a(4). The FCF MAC of FCF device 206a may be associated with the FSB port 204a(4) upon which the FSB 204a received the MDA 902. For example, the FSB pinning table entry 702a of the FSB pinning table 702 illustrates how the FCoE pinning engine 605 may operate to pin the FSB port 204a(4) with FCoE traffic by associating the FCF device identifier of the FCF device 206a ("FCF_MAC206a") to an FSB port identifier ("FSB port 204a(4)").

Figure 12A:
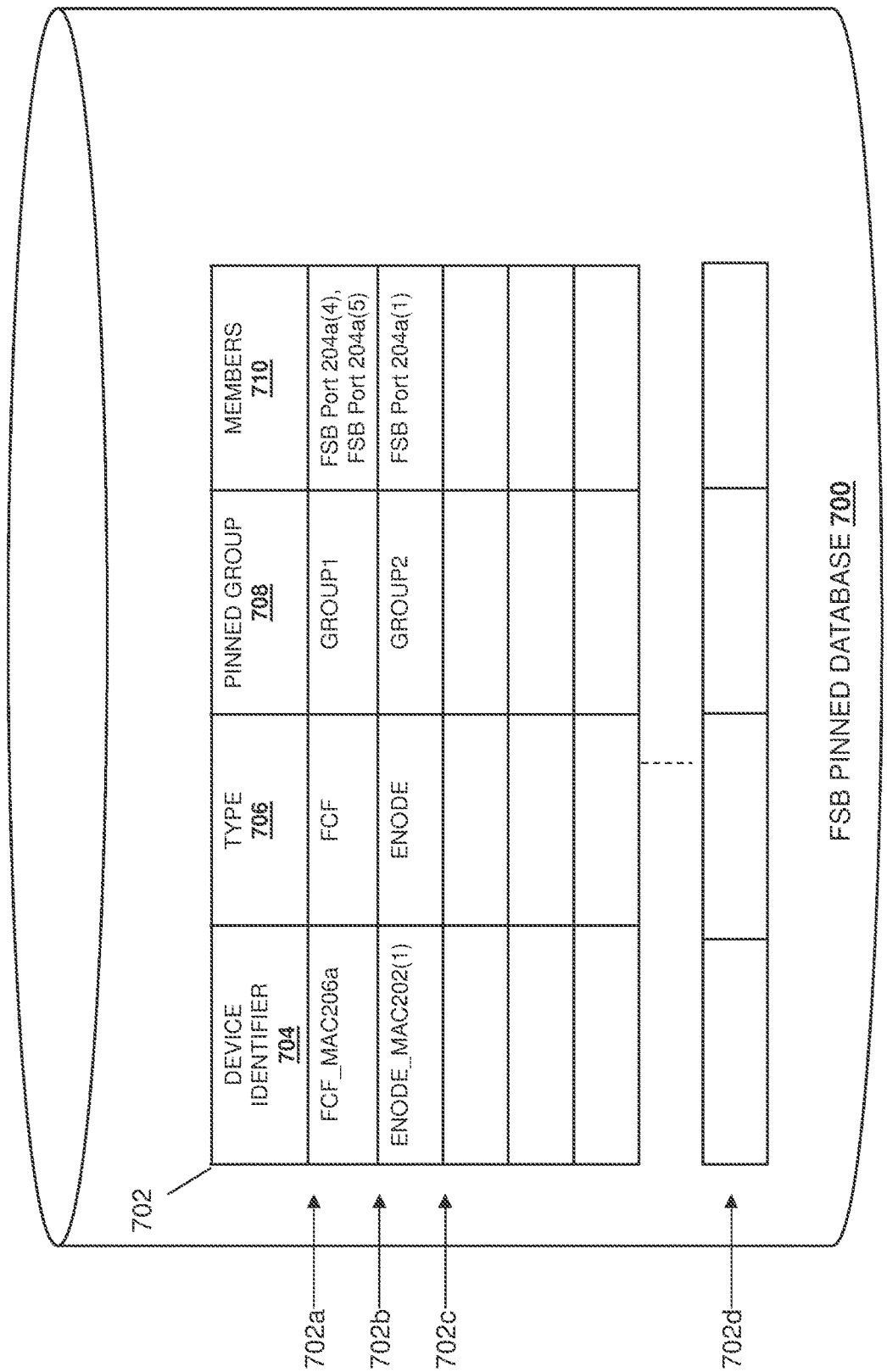
FIG. 12A is a schematic view illustrating an embodiment of information being provided in the FSB pinned database of FIG. 7 for the FCoE auto-pinning system of FIG. 2D during the method of FIG. 8.

In another example and with reference to the FSB 204a of the FCoE pinning system 200d in FIG. 2D, the FSB 204a may maintain an FSB pinning table 702 in the FSB pinned database 700 of FIG. 12A that provides the pinned group members of FSB ports. In this example, there are two links (e.g., the link 214f and the link 214g) connecting the FSB 204 with the FCF device 206a. The FSB 204a may receive the MDA 902 that includes the FCF device MAC address for the FCF device 206a on the FSB port 204a(4) and on the FSB port 204a(5). The FCF MAC of FCF device 206a may be associated with the FSB port 204a(4) and the FSB port 204a(5) upon which the FSB 204a received the MDA 902. For example, the FSB pinning table entry 702a of the FSB pinning table 702 illustrates how the FCoE pinning engine 605 may operate to pin the group of the FSB port 204a(4) and the FSB port 204a(5) with FCoE traffic by associating the FCF device identifier of the FCF device 206a ("FCF_MAC206a") to FSB port identifiers ("FSB port 204a(4)") and ("FSB port 204a(5)").

After the FCoE pinning at the FSB 204a is completed, the FSB 204a may send an FSB pinned notification, which includes an FSB identifier, through the FSB ports that are members of the pinned group. As illustrated in FIG. 9B, the FSB pinned notification may be a special FIP frame 904 that indicates to the FCF device 206a that the FSB 204a has pinned FSB ports of the aggregated interface for FCoE traffic. The FSB identifier may be an identifier of the FSB 204a such as, for example, an FSB MAC address. For example, the FSB 204a in the FCoE pinning system 200b of FIG. 2B and the FCoE pinning system 200c in FIG. 2C may send the FSB pinned notification through the FSB port 204a(4), and the FSB 204a in the FCoE pinning system 200d FIG. 2D may send the FSB pinned notification through the FSB port 204a(4) and the FSB port 204a(5).

In various embodiments, the FSB 204a may forward the FCF advertisement received from the FCF device 206a. The FCF advertisement may be forwarded through any FSB port that is a member of the aggregated interface 216. For example, the FSB 204a of the FCoE pinning system 200b of FIG. 2B may send a forwarded MDA 906 through the FSB port 204a(1) and the FSB port 204a(2). The FSB 204a of the FCoE pinning system 200c of FIG. 2C and the FCoE pinning system 200d of FIG. 2D may send the forwarded MDA 906 through the FSB port 204a(1).

The method 800 then proceeds to block 804 where a server message that includes an ENode identifier is received in response to the sending of the FCF advertisement at block 802. In an embodiment of block 804, the FCF device 206a of the FCoE pinning system 200a of FIG. 2A may receive a server message from the server device 202 that was sent by the server device 202 in response to the server device 202 receiving the FCF advertisement. For example and with reference to FIG. 9A, the server device 202 may receive the MDA 902 on the server port 202(1) and 202(2). The server device 202 may then provide a server message, such as a FLOGI 908, through the server port 202(1) that is then received at the FCF device port 206a(1). Similarly, the server device 202 may provide a FLOGI 908 through the server port 202(2) that is then received at the FCF device port 206a(2). While a FLOGI 908 is provided as a server device message in the illustrated embodiment, one of skill in the art in possession of the present disclosure will recognize that the server device message may be another server message that includes an ENode identifier such as a virtual local area network (VLAN) notification or a VLAN solicitation while remaining within the scope of the present disclosure as well.

In an embodiment of block 804, and with reference to FIG. 9B and the FCoE pinning systems 200b-200d of FIGS. 2B-2D, the FCF device 206a may receive the server message through the FCF device port 206a(1) and/or, if sent in the FCoE pinning system 200d of FIG. 2D, through the FCF device port 206a(2). For example, the server device 202 may receive the forwarded MDA 906 through server port 202(1) and/or, if sent in the FCoE pinning system 200b of FIG. 2D, through the server port 202(2). In response, the server device 202 may send the server message (e.g., FLOGI 908) through the server port 202(1) and/or through the server port 202(2). The FSB 204a may receive the server message through FSB ports 204a(1) and/or 204a(2). The FSB 204a may learn the ENode identifier (e.g., an ENode MAC address) from the server message that is received on at least one of the FSB ports 204a(1) and/or 204a(2) that are members of the aggregated interface 216, and associate those ports with a respective ENode identifier to form a respective group that is pinned for FCoE traffic.

Figure 10A:
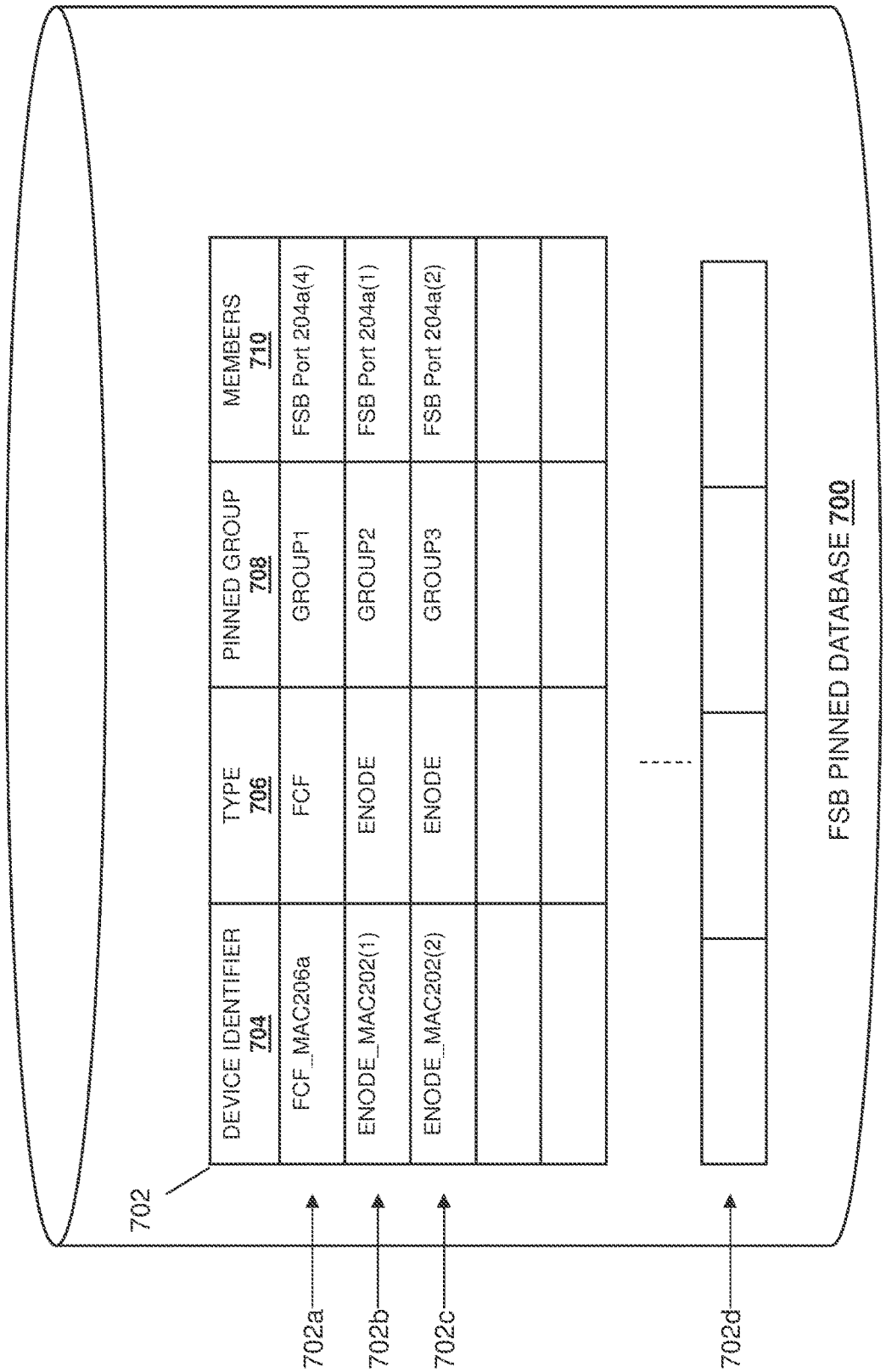
FIG. 10A is a schematic view illustrating an embodiment of information being provided in the FSB pinned database of FIG. 7 for the FCoE pinning system of FIG. 2B during the method of FIG. 8.

In an embodiment of block 804, and with reference to the FSB pinned database 700 of FIGS. 10A, 11A, and 12A, the FCoE pinning engine 605 may add the ENode identifier to its respective to the FSB pinning table 702. For example, the FSB 204a of the FCoE pinning system 200b in FIG. 2B may add pinned groups of ENode identifiers and FSB ports to the FSB pinning table 702 in the FSB pinned database 700 of FIG. 10A. For example, the FSB pinning table entry 702b of the FSB pinning table 702 illustrates how the FCoE pinning engine 605 may operate to pin the FSB port 204a(1) with FCoE traffic by associating the ENode identifier ("ENode_MAC202(1)") of the server port 202(1) of server device 202a with an FSB port identifier ("FSB port 204a(1)"). Also, the FSB pinning table entry 702c of the FSB pinning table 702 illustrates how the FCoE pinning engine 605 may operate to pin the FSB port 204a(2) with FCoE traffic by associating the ENode identifier ("ENode_MAC202(2)") of the server port 202(2) of the server device 202a with an FSB port identifier ("FSB port 204a(2)"). Thus, because of the pinning, both links 214a and 214b may be used to provide FCoE traffic, rather than only the one of those links that would be available in conventional systems.

In another example, and with reference to the FSB 204a of the FCoE pinning system 200c in FIG. 2C, the FSB 204a may add pinned groups of ENode identifiers and FSB ports to the FSB pinning table 702 in the FSB pinned database 700 of FIG. 11A. For example, the FSB pinning table entry 702b of the FSB pinning table 702 illustrates how the FCoE pinning engine 605 may operate to pin the FSB port 204a(1) with FCoE traffic by associating the ENode identifier ("ENode_MAC202(1)") of the server port 202(1) of server device 202a with the FSB port ("FSB port 204a(1)"). Similarly and with reference to the FSB 204a of the FCoE pinning system 200d in FIG. 2D, the FSB 204a may add pinned groups of the ENode identifiers and the FSB ports to the FSB pinning table 702 in the FSB pinned database 700 of FIG. 12A. For example, the FSB pinning table entry 702b of the FSB pinning table 702 illustrates how the FCoE pinning engine 605 may operate to pin the FSB port 204a(1) with FCoE traffic by associating the ENode identifier ("ENode_MAC202(1)") of the server port 202(1) of server device 202a with the FSB port ("FSB port 204a(1)").

The FSB 204a may then forward the server message(s) to the FCF device 206a such that they are received by the FCF device 206a. In the example illustrated in 9B, the FSB 204a may forward the FLOGI 910 to the FCF device 206. For example and with reference to the FCoE pinning system 200b of FIG. 2B, the FSB 204a may forward the server message received from the server port 202(1) and the server message received from the server port 202(2) through the FSB port 204a(4). The FCF device 206a may then receive the server messages through the FCF device port 206a(1). In another example and with reference to the FCoE pinning system 200c of FIG. 2C, the FSB 204a may forward the server message received from the server port 202(1) through the FSB port 204a(4). The FCF device 206a may then receive the server message through the FCF device port 206a(1). In another example and with reference to the FCoE pinning system 200d of FIG. 2D, the FSB 204a may forward the server message received from the server port 202(1) through the FSB port 204a(4) or the FSB port 204a(5). Because the FSB port 204a(4) and the FSB port 204a(5) are pinned for FCoE traffic and belong to the same group (as indicated in the FSB pinning table entry 702a of FIG. 12A), the FSB 204a may hash FCoE traffic, including the server messages, between the FSB port 204a(4) and the FSB port 204a(5).

The method 800 may then proceed to block 806 where an ENode identifier from the server message is associated with an FCF device port to form an FCF group that is then pinned for FCoE traffic. In an embodiment of block 806, the FCF device 206a of the FCoE pinning system 200a of FIG. 2A may associate the ENode identifier that was provided in the server message with the FCF device port on which that server message was received.

Figure 12B:
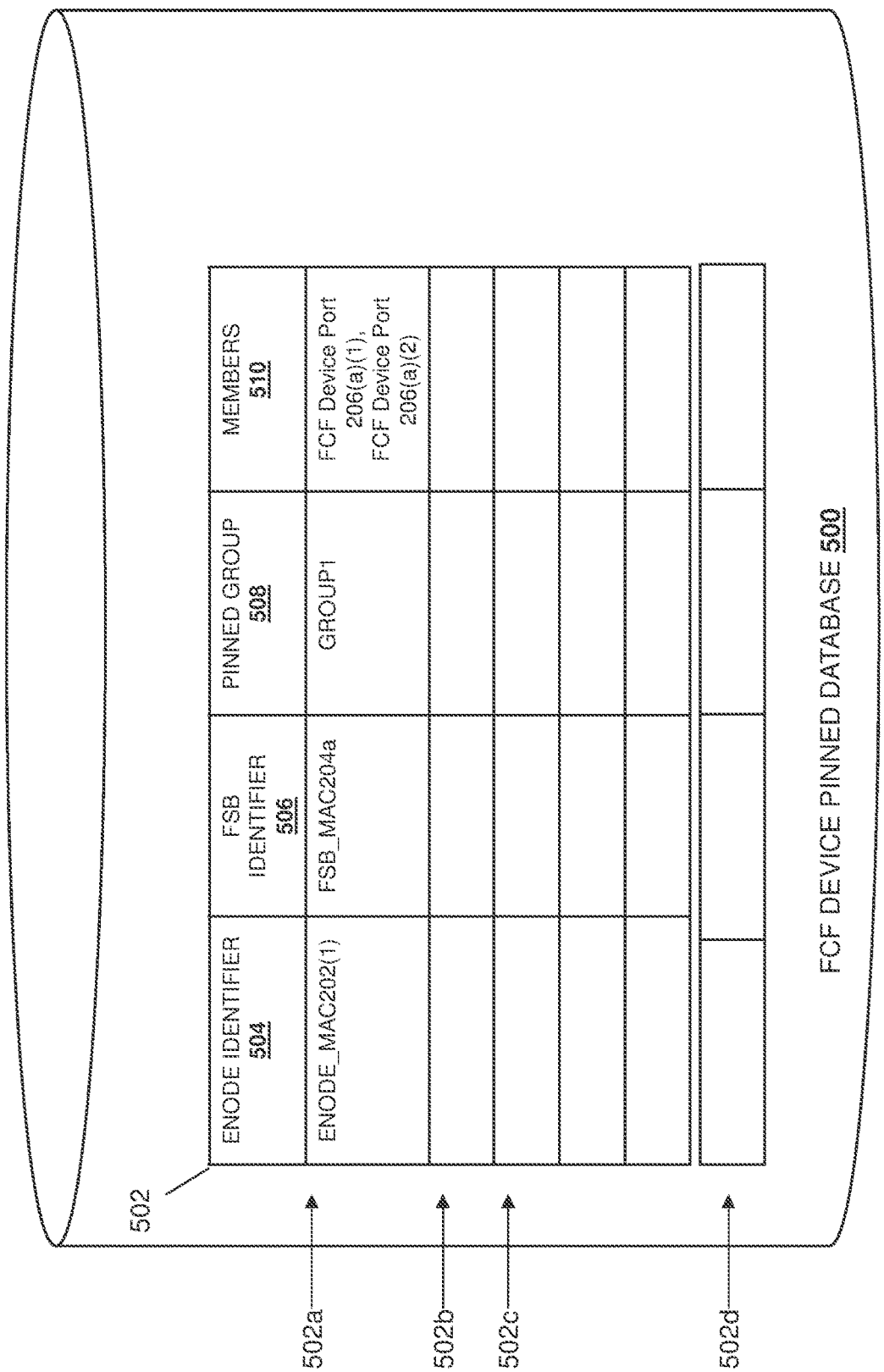
FIG. 12B is a schematic view illustrating an embodiment of information being provided in the FCF device pinned database of FIG. 5 for the FCoE auto-pinning system of FIG. 2D during the method of FIG. 8.
Figure 13:
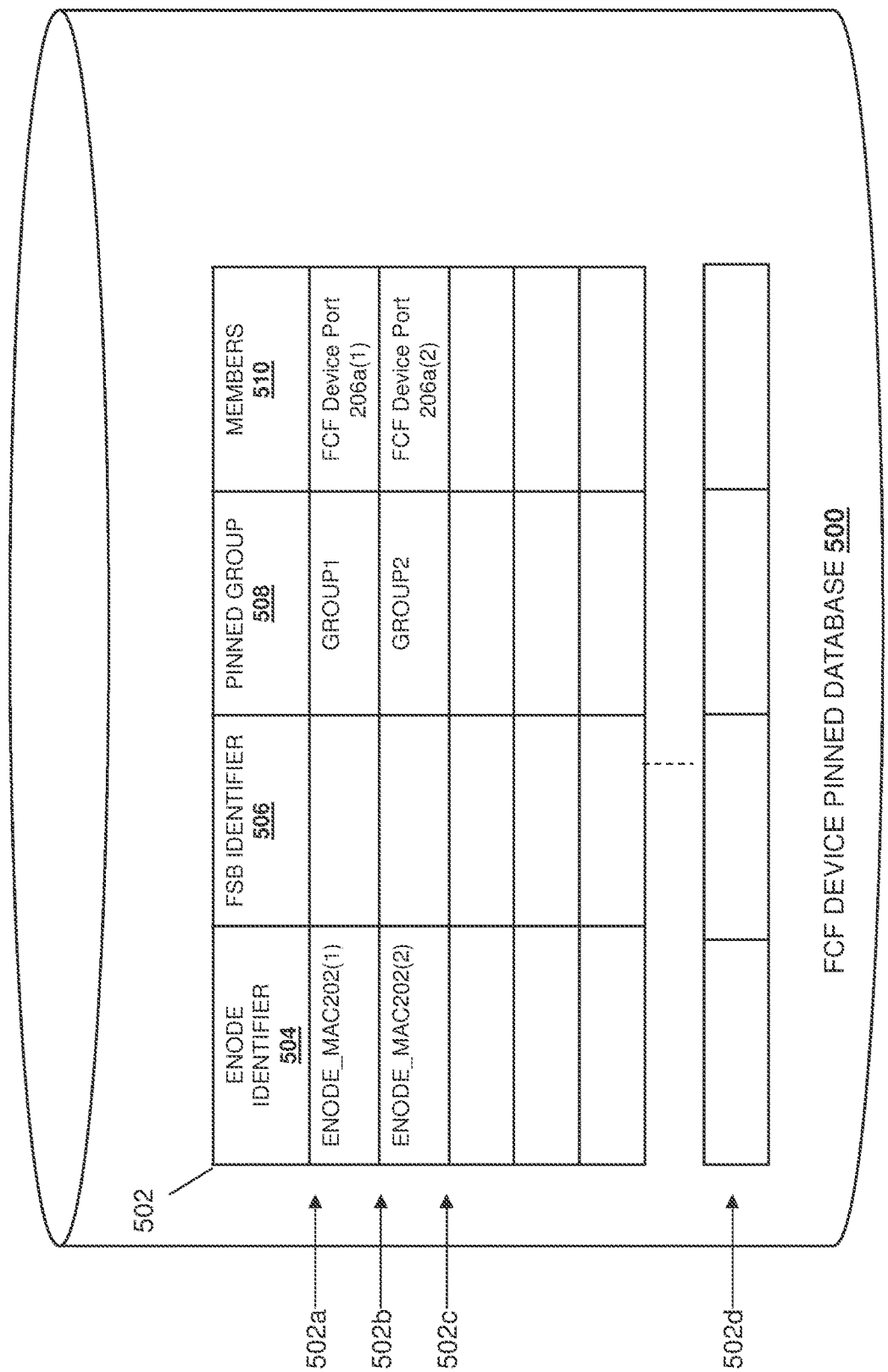
FIG. 13 is a schematic view illustrating an embodiment of information being provided in the FCF device pinned database of FIG. 5 for the FCoE auto-pinning system of FIG. 2A during the method of FIG. 8.

In an embodiment of block 806 and with reference to the FCF device pinned database 500 of FIGS. 10B, 11B, 12B, and 13, the FCoE pinning engine 405 may generate one or more pinning tables. For example, the FCF device 206a of the FCoE pinning system 200a in FIG. 2A may maintain an FCF device pinning table 502 in the FCF device pinned database 500 of FIG. 13 that provides the pinned group members of FCF device ports. For example, the FCF device pinning table entry 502a of the FCF device pinning table 502 of FIG. 13 illustrates how the FCoE pinning engine 405 may operate to pin the FCF device port 206a(1) with FCoE traffic by associating the ENode identifier of the server port 202(1) ("ENODE_MAC202(1)") of the server device 202 with the FCF device port 206a(1) ("FCF Device Port 206a(1)") through which the FCF device 206a received the server message that provided the ENode identifier. Similarly, because there are two links 210a and 210b that are included in the aggregated interface 212, the FCF device pinning table entry 502b of the FCF device pinning table 502 illustrates how the FCoE pinning engine 405 may operate to pin the FCF device port 206a(2) with FCoE traffic by associating the ENode identifier of the server port 202(2) ("ENODE_MAC202(2)") of the server device 202 with the FCF device port 206a(2) ("FCF Device Port 206a(2)") through which the FCF device 206a received the server message that provided the ENode identifier. Because there are no FSBs between the server device 202 and the FCF device 206a in the FCoE pinning system 200a, the FSB identifier column 506 is left without an entry.

However, in various embodiments and with reference to the FCoE pinning systems 202b-202d of FIGS. 2B-2D, the FCF device 206a may associate each FSB identifier, which is received in the FSB pinned notification from the FSB 204a, with the FCF device port on which the FSB pinned notification was received. Each FSB identifier may be associated with the pinned group that the associated FCF device port is a member. In various embodiments, the FCF device 206 may associate each FSB identifier that is received in the FSB pinned notification from the FSB 204a with the FCF device port on which the FSB pinned notification was received prior to the pinned group being formed that associates the ENode identifier with the FCF device port. Thus, the association of the FSB identifier with the FCF device port may form a group that is pinned for FCoE traffic. FCF device ports that receive FSB pinned notifications that include the same FSB identifier may be included in the same group.

Figure 10B:
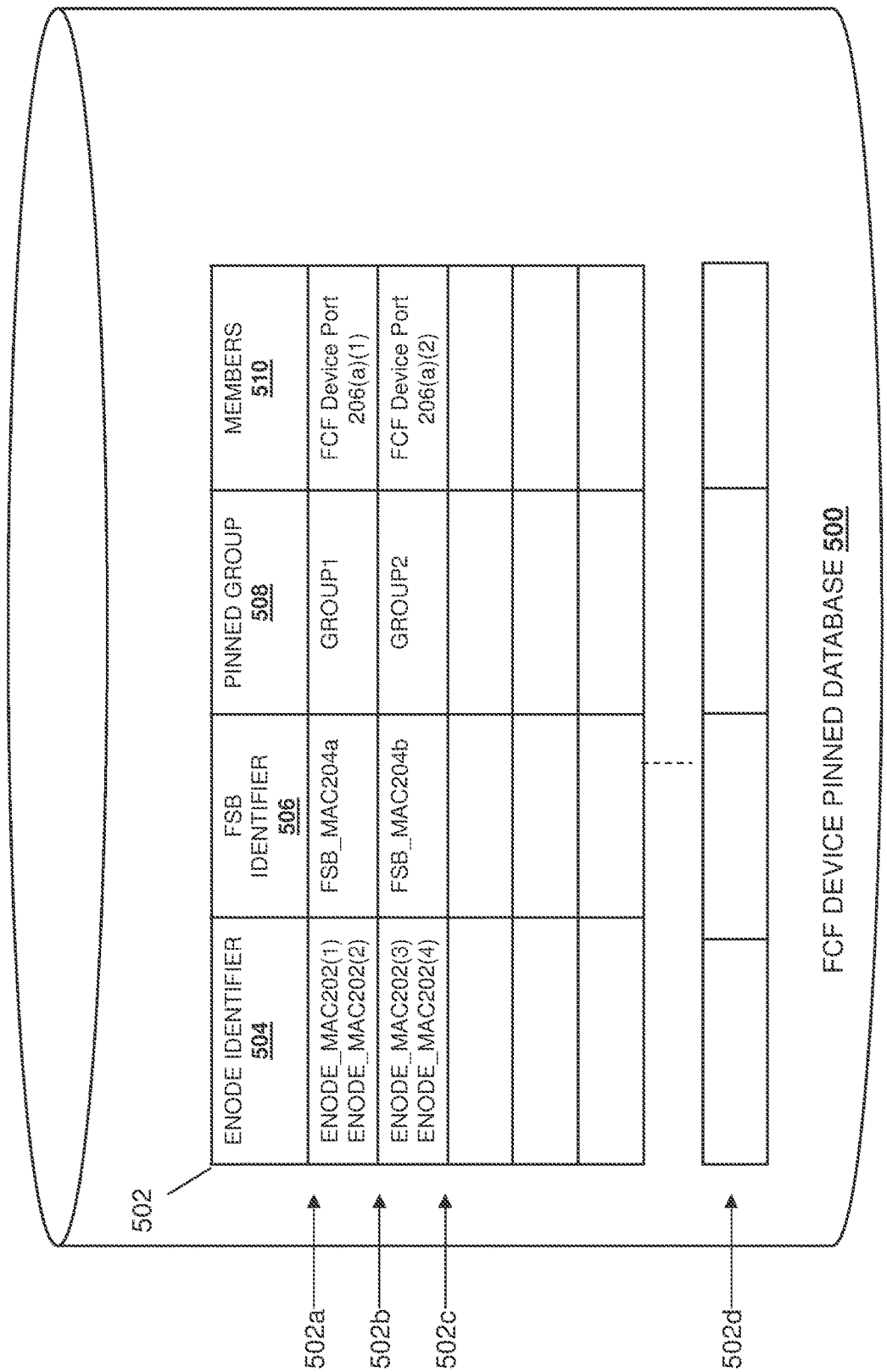
FIG. 10B is a schematic view illustrating an embodiment of information being provided in the FCF device pinned database of FIG. 5 for the FCoE auto-pinning system of FIG. 2B during the method of FIG. 8.

For example, the FCF device 206a of the FCoE pinning system 200b of FIG. 2B may maintain an FCF device pinning table 502 in the FCF device pinned database 500 of FIG. 10B that provides the pinned group members of the FCF device ports on the FCF device 206a. The FCF device pinning table entry 502a of the FCF device pinning table 502 illustrates how the FCoE pinning engine 405 may operate to pin the FCF device port 206a(1) with FCoE traffic by associating the FCF device port 206a(1) ("FCF Device Port 206a(1)") of FCF device 206a with the FSB identifier ("FSB_MAC204a") of FSB 204a, with the ENode identifier ("ENODE_MAC202(1)") of server port 202(1), and with the ENode identifier ("ENODE_MAC202(2)") of the server port 202(2). Similarly, the FCF device pinning table entry 502b of the FCF device pinning table 502 illustrates how the FCoE pinning engine 405 may operate to pin the FCF device port 206a(2) with FCoE traffic by associating the FCF device port 206a(2) ("FCF Device Port 206a(2)") of FCF device 206a with the FSB identifier ("FSB_MAC204b") of FSB 204b, with the ENode identifier ("ENODE_MAC202(3)") of server port 202(3), and with the ENode identifier ("ENODE_MAC202(4)") of the server port 202(4).

In another example, the FCF device 206a of the FCoE pinning system 200c in FIG. 2C may maintain an FCF device pinning table 502 in the FCF device pinned database 500 in FIG. 11B that provides the pinned group members of the FCF device ports on the FCF device 206a. For example, the FCF device pinning table entry 502a of the FCF device pinning table 502 illustrates how the FCoE pinning engine 405 may operate to pin the FCF device port 206a(1) with FCoE traffic by associating the FCF device port 206a(1) ("FCF Device Port 206a(1)") of FCF device 206a with the FSB identifier ("FSB_MAC204a") of FSB 204a, and with the ENode identifier ("ENODE_MAC202(1)") of server port 202(1). Similarly, the FCF device pinning table entry 502b of the FCF device pinning table 502 illustrates how the FCoE pinning engine 405 may operate to pin the FCF device port 206a(2) with FCoE traffic by associating the FCF device port 206a(2) ("FCF Device Port 206a(2)") of FCF device 206a with the FSB identifier ("FSB_MAC204b") of FSB 204b, and with the ENode identifier ("ENODE_MAC202(4)") of server port 202(4).

In another example, the FCF device 206a of the FCoE pinning system 200d in FIG. 2D may maintain an FCF device pinning table 502 in the FCF device pinned database 500 of FIG. 12B that provides the pinned group members of the FCF device ports of the FCF device 206a. For example, the FCF device pinning table entry 502a of the FCF device pinning table 502 illustrates how the FCoE pinning engine 405 may operate to pin the FCF device port 206a(1) and the FCF device port 206a(2) with FCoE traffic by associating the FCF device port 206a(1) ("FCF Device Port 206a(1)") and the FCF device port 206a(2) ("FCF Device Port 206a(2)") of FCF device 206a with the FSB identifier ("FSB_MAC204a") of FSB 204a, and with the ENode identifier ("ENODE_MAC202(1)") of server port 202(1).

The method 800 then proceeds to block 808 where FCoE traffic is provided on the pinned FCF device ports. In an embodiment of block 808, the FCF device 206a may provide an FCF response message in response to the server message received at block 804. For example, the FCF response message may include an FLOGI accept message (e.g., a FLOGI LS_ACC), which may be sent in response to the server message that included the FLOGI 908 in order to complete a fabric login. The FCF device 206a may send the FCF response message on the FCF device port(s) that are members of a pinned group. As illustrated in FIG. 9A and with reference to the FCoE pinning system 200a, the FCF device 206a may send the FCF response message 912 to the server device 202. As illustrated in FIG. 9B and with reference to the FCoE pinning systems 200b-200d of FIGS. 2B-2D, the FCF device 206a may send the FCF response message 912 to the server device 202 via the FSB 204a, which forwards the FCF response message as a forwarded FCF response message 914 to the server device 202.

In various embodiments, once fabric login is completed, FCoE traffic may now be provided through the FCF device port(s) and the FSB ports that are pinned for FCoE traffic. The FSB 204a and/or the FCF device 206a may reference the respective FSB pinned database 606 and FCF device pinned database 406 to determine which ports of the FSB 204a and/or the FCF device 206a in the aggregated interface are pinned for FCoE traffic, or otherwise support routing of FCoE traffic. If multiple links in a pinned group exist, the FCoE traffic may be load balanced between the links via, for example, hashing operations performed on the FCoE traffic. If a link that is included in a pinned group of the FCF device 206a goes down, the FCoE pinning engine 405 in the FCF device 206a may remove the port or downstream device identifier from the pinned group in the FCF device pinned database 406. Similarly, if a link that is included in a pinned group of the FSB 204a goes down, the FCoE pinning engine 605 of the FSB 204a may remove the FSB port, downlink (e.g., ENode), and/or uplink (e.g., FCF device) device identifier from the pinned group in the FSB pinned database 606. Alternatively, if a link is added to an aggregated interface, the FCoE pinning engine 405 of the FCF device 206a may add the port or downstream device identifier to the pinned group, or generate a new pinned group in the FCF device pinned database 406 according to the method 800. Similarly, the FCoE pinning engine 605 of the FSB 204a may add the FSB port, downlink, and/or uplink device identifier to the pinned group, or generate a new pinned group in the FCF device pinned database 406 according to the method 800.

Thus, systems and methods have been presented that provide for FCoE pinning in a manner that allows more than one FSB port or FCF device port in an aggregated interface to be automatically pinned for FCoE traffic. An FCF device and, in some embodiments, an FSB may maintain pinning tables where multiple links may be pinned as groups and referenced when providing FCoE traffic. Thus, the systems and methods of the present disclosure solve the issues with conventional pinning systems that limit the number of CNA ports used for FCoE traffic (i.e., to one port per SAN fabric) when those CNA ports are members of an aggregated interface. For example, specific embodiments the pinning tables of the present disclosure allow FCoE traffic to be provided on each CNA port in a four port CNA. Furthermore, by pinning multiple links between an ENode and an FCF device for FCoE traffic, the systems and methods of the present disclosure reduce latency associated with FCoE traffic, free bandwidth on the links between the FCF device and the ENode, and relieve congestion on those links.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Fibre Channel over Ethernet (FCoE) pinning system, comprising:
   a first Fibre Channel (FC) storage device;
   a first server device; and
   a first FC forwarder (FCF) device that is coupled to the first FC storage device through a first FCF device port, and that is coupled to the first server device through a second FCF device port and a third FCF device port that are included on an aggregated interface, wherein the first FCF device is configured to:
   send a first FCF advertisement through the second FCF device port;
   receive, from the first server device at the second FCF device port in response to sending the first FCF advertisement through the second FCF device port, a server message that includes a first server port identifier of a first server port;
   associate the first server port identifier with the second FCF device port to form a first FCF group;
   pin the first FCF group for FCoE traffic;
   send a second FCF advertisement through the third FCF device port;
   receive, from the first server device at the third FCF device port in response to sending the second FCF advertisement through the third FCF device port, a server message that includes a second server port identifier of a second server port;
   associate the second server port identifier with the third FCF device port to form a second FCF group; and
   pin the second FCF group for FCoE traffic.

2. The FCoE pinning system of claim 1, further comprising:
   a first FCoE Initialization Protocol (FIP) Snooping Bridge (FSB) that is coupled to the second FCF device port through a first FSB port, that is coupled to the third FCF device port through a second FSB port, and that is coupled to the first server device through a third FSB port, wherein the first FSB is configured to:
   receive, through the first FSB port, the first FCF advertisement sent through the second FCF device port;
   receive, through the second FSB port, the second FCF advertisement sent through the third FCF device port, wherein the first FCF advertisement sent through the second FCF device port and the second FCF advertisement sent through the third FCF device port include the same FCF device identifier;
   associate the FCF device identifier with the first FSB port and the second FSB port to form a first FSB group; and
   pin the first FSB group for FCoE traffic.

3. The FCoE pinning system of claim 2, wherein the first FSB is further configured to:
   send an FSB pinned notification that includes an FSB identifier through the first FSB port and the second FSB port, and wherein the first FCF device is configured to:
   receive the FSB pinned notification at the second FCF device port and the third FCF device port; and
   associate the FSB identifier, the second FCF device port, and the third FCF device port with the first FCF group.

4. The FCoE pinning system of claim 3, wherein the first FCF device is configured to:
   hash FCoE traffic between the second FCF device port and the third FCF device port.

5. The FCoE pinning system of claim 2, wherein the first FSB is further configured to:

forward the first FCF advertisement through the third FSB port;
receive, from the first server device at the third FSB port in response to forwarding the first FCF advertisement through the third FSB port, the server message that includes the first server port identifier of the first server port;
associate the first server port identifier with the third FSB port to form a second FSB group; and
pin the second FSB group for FCoE traffic.

6. The FCoE pinning system of claim 1, further comprising:
a first FCoE Initialization Protocol (FIP) Snooping Bridge (FSB) that is coupled to the second FCF device port through a first FSB port, and that is coupled to the first server device through a second FSB port, wherein the first FSB is configured to:
receive, through the first FSB port, the first FCF advertisement sent through the second FCF device port;
associate the FCF device identifier to the first FSB port to form a first FSB group;
pin the first FSB group for FCoE traffic; and
send an FSB pinned notification that includes an FSB identifier through the first FSB port.

7. The FCoE pinning system of claim 6, further comprising:
a second FSB that is coupled to the third FCF device port through a third FSB port, and that is coupled to the first server device through a fourth FSB port, wherein the first FCF device is configured to:
receive the FSB pinned notification from the first FSB at the second FCF device port;
associate the FSB identifier of the first FSB with the first FCF group;
receive an FSB pinned notification from the second FSB at the third FCF device port; and
associate the FSB identifier of the second FSB and the third FCF device port to form the second FCF group.

8. The FCoE pinning system of claim 6, wherein the first FCF device is further configured to:
receive, from the first server device at the second FCF device port and via the first FSB port, a server message that includes a second server port identifier of a second server port; and
associate the second server port identifier with the first FCF group.

9. An Information Handling System (IHS), comprising:
a plurality of ports;
a processing system that is coupled to the plurality of ports; and
a memory system that is coupled to the processing system and that includes instructions that, when executed by the processing system, cause the processing system to provide an Fibre Channel over Ethernet (FCoE) pinning engine that is that is executed by the processing system to:
send a first FC forwarder (FCF) advertisement through a first port of the plurality of ports that is a member of an aggregated interface;
receive, from a first server device at the first port in response to sending the first FCF advertisement through the first port, a server message that includes a first server port identifier of a first server port;
associate the first server port identifier with the first port to form a first FCF group; and
pin the first FCF group for FCoE traffic;
send a second FCF advertisement through a second port of the plurality of ports and that is a member of the aggregated interface;
receive, from the first server device at the second port in response to sending the second FCF advertisement through the second port, a server message that includes a second server port identifier of a second server port;
associate the second server port identifier with the second port to form a second FCF group; and
pin the second FCF group for FCoE traffic.

10. The IHS of claim 9, wherein the FCoE pinning engine is further configured to:
receive a FCoE Initialization Protocol (FIP) Snooping Bridge (FSB) pinned notification that includes an FSB identifier from an FSB at the first port and the second port; and
associate the FSB identifier, the first port, and the second port with the first FCF group.

11. The IHS of claim 10, wherein the FCoE pinning engine is further configured to:
hash FCoE traffic between the first port and the second port.

12. The IHS of claim 10, wherein the FSB pinned notification is received in response to the FSB:
receiving, through a first FSB port of a plurality of FSB ports and that is included in the aggregated interface, the first FCF advertisement sent through the first port;
receiving, through a second FSB port, the second FCF advertisement sent through the second port, wherein the first FCF advertisement sent through the first port and the second FCF advertisement sent through the second port include the same FCF device identifier;
associating the FCF device identifier with the first FSB port and the second FSB port to form a first FSB group; and
pinning the first FSB group for FCoE traffic.

13. The IHS of claim 9, wherein the FCoE pinning engine is configured to:
receive an FSB pinned notification that includes an FSB identifier of a first FSB at the first port;
associate the FSB identifier of the first FSB with the first FCF group that includes the first port;
receive an FSB pinned notification that includes an FSB identifier of a second FSB at the second port;
associate the FSB identifier of the second FSB with the second port to form the second FCF group; and
pin the second FCF group for FCoE traffic.

14. The IHS of claim 13, wherein the FCoE pinning engine is configured to;
receive, from the first server device at the first port and via the first FSB, a server message that includes a second server port identifier of a second server port; and
associate the second server port identifier with the first FCF group.

15. A method of Fibre Channel over Ethernet (FCoE) pinning, comprising:
sending, by a Fibre Channel Forwarder (FCF) device, a first FCF advertisement through a first FCF device port that is a member of an aggregated interface;
receiving, by the FCF device from a first server device at the first FCF device port in response to sending the first FCF advertisement through the first FCF device port, a server message that includes a first server port identifier of a first server port;
associate, by the FCF device, the first server port identifier with the first FCF device port to form a first FCF group;

pinning, by the FCF device, the first FCF group for FCoE traffic;

sending, by the FCF device, a second FCF advertisement through a second FCF device port that is a member of the aggregated interface;

receiving, by the FCF device and from the first server device at the second FCF device port in response to sending the second FCF advertisement through the second FCF device port, a server message that includes a second server port identifier of a second server port;

associating, by the FCF device, the second server port identifier with the second FCF device port to form a second FCF group; and pinning, by the FCF device, the second FCF group for FCoE traffic.

16. The method of claim 15, further comprising:

receiving, by the FCF device, an FCoE Initialization Protocol (FIP) Snooping Bridge (FSB) pinned notification from an FSB that includes an FSB identifier at the first FCF device port and the second FCF device port; and associating, by the FCF device, the FSB identifier, the first FCF device port, and the second FCF device port with the first FCF group.

17. The method of claim 15, further comprising:

hashing, by the FCF device, FCoE traffic between the first FCF device port and the second FCF device port.

\* \* \* \* \*